(12) United States Patent
Hasegawa et al.

(10) Patent No.: US 7,161,751 B2
(45) Date of Patent: Jan. 9, 2007

(54) OPTICAL MODULE AND CAMERA MODULE

(75) Inventors: Haruhiko Hasegawa, Chiba (JP); Hideki Kitajima, Chiba (JP); Shigeyuki Masuda, Chiba (JP); Tamio Nomura, Chiba (JP); Takayuki Kosaka, Chiba (JP)

(73) Assignee: Seiko Instruments Inc. (JP)

( * ) Notice: Subject to any disclaimer, the term of this patent is extended or adjusted under 35 U.S.C. 154(b) by 0 days.

(21) Appl. No.: 11/186,007

(22) Filed: Jul. 20, 2005

(65) Prior Publication Data

US 2006/0016280 A1    Jan. 26, 2006

(30) Foreign Application Priority Data

Jul. 21, 2004   (JP)   ............................. 2004-213050
Mar. 15, 2005   (JP)   ............................. 2005-073316
Jun. 28, 2005   (JP)   ............................. 2005-188753

(51) Int. Cl.
*G02B 7/02* (2006.01)
*G02B 15/14* (2006.01)
*G03B 17/00* (2006.01)

(52) U.S. Cl. .................. 359/829; 359/696; 396/75; 396/82; 396/529

(58) Field of Classification Search ................ 359/827, 359/829, 694, 696, 697, 198; 396/75, 79, 396/82, 284, 373, 459, 461, 529; 74/55, 74/89.23
See application file for complete search history.

(56) References Cited

U.S. PATENT DOCUMENTS

| | | | | |
|---|---|---|---|---|
| 5,086,312 | A * | 2/1992 | Tanaka et al. ................. | 396/75 |
| 6,714,357 | B1 * | 3/2004 | Yamazaki .................... | 359/696 |
| 6,813,441 | B1 * | 11/2004 | Yamazaki ..................... | 396/82 |
| 7,050,713 | B1 * | 5/2006 | Nomura ........................ | 396/75 |
| 7,097,367 | B1 * | 8/2006 | Nomura ........................ | 396/349 |

* cited by examiner

*Primary Examiner*—Loha Ben
(74) *Attorney, Agent, or Firm*—Adams & Wilks

(57) ABSTRACT

An optical unit is disclosed which is capable of being easily assembled, enabling its optical element to smoothly move, and preventing friction loss from being generated around its nut member. A lens driving apparatus is provided for moving an optical element holder, which supports an optical element having an optical axis and is movable along a guide member, in an extension direction of the optical axis, using a nut integrally provided at the holder, and a lead screw threadedly coupled to the nut to rotate forward and backward by a driving unit. In the lens driving apparatus, the forward or backward rotation of the motor is transmitted to the lead screw via a reduction gear train. The lead screw is installed to be inclinedly movable with respect to the extension direction of the optical axis about threaded coupling portions of a threaded section of the lead screw and the nut.

20 Claims, 14 Drawing Sheets

OPTICAL MODULE AND CAMERA MODULE

BACKGROUND OF THE INVENTION

1. Field of the Invention

The present invention relates to an optical module which is mounted in a portable electronic appliance such as a card type digital camera or a camera-attached telephone, and is equipped with an optical element movable for focus adjustment, zooming, or the like, and a camera module using the same.

2. Description of the Related Art

Japanese Patent Publication No. 3031127 discloses a lens driving apparatus for moving a lens in an extension direction of an optical axis (hereinafter, referred to as an "optical axis direction"). As disclosed in Japanese Patent Publication No. 3031127 (Para. 0007–0009, and FIGS. 1 to 3), this lens driving apparatus includes a motor provided with a lead screw as a rotating shaft thereof, a lens holding frame slidable along a guide shaft extending in the optical axis direction, and a nut mounted to the lens holding frame such that the nut is substantially integrated with the lens holding frame. The lead screw is threadedly coupled to the lead screw, so that the lens holding frame, which holds a lens, is moved in the optical axis direction as the nut moves in the optical axis direction in accordance with rotation of the lead screw.

Also, Japanese Unexamined Patent Publication No. 2002-296480 discloses a lens driving apparatus. As disclosed in Japanese Unexamined Patent Publication No. 2002-296480 (Para. 0023–0030, and FIGS. 1 to 4), this lens driving apparatus includes a motor provided with a lead screw as a rotating shaft thereof, a nut plate threadedly coupled to the lead screw such that the nut plate is movable in the optical axis direction, and a lens holding frame in contact with the nut plate and slidable along a guide shaft extending in the optical axis direction. The lens holding frame is urged against the nut plate by elastically urging means. In accordance with rotation of the lead screw, the nut plate and the lens holding frame which holds a lens slide along the guide shaft, so that the lens is moved in the optical axis direction.

In such a case, generally, two radial bearings are arranged on the rotating shaft of the motor at positions spaced apart from each other by a certain distance, for example, upper and lower shaft end portions in the motor, respectively, so as to support the rotating shaft such that the rotating shaft does not rock.

Also, Japanese Unexamined Patent Publication No. Heisei 2-65650 discloses a structure wherein two radial bearings are arranged at upper and lower portions of a lead screw, respectively (FIG. 4 of the Publication).

In accordance with the techniques disclosed in all the above publications, a lead screw is provided, as a rotating shaft, at a driving motor, and a nut member such as a nut or a nut plate is moved in an optical axis direction in accordance with rotation of the lead screw. Meanwhile, the rotating shaft of the motor is supported by a motor frame via a pair of bearings arranged to be spaced apart from each other. By virtue of such 2-point support, the rotating shaft is maintained in a substantially uninclined state.

Accordingly, in the structure in which the nut is substantially integrated with the lens holding frame, as in Japanese Patent Publication No. 3031127, creaking or scratching may occur between the lens holding frame, which is moved via the nut in accordance with rotation of the lead screw, and the guide shaft, which guides the lens holding frame, due to a parallelism or position deviation between the lead screw and the guide shaft. In order to prevent such a phenomenon, an assembly process capable of minimizing the deviation is needed. In particular, it is necessary to mount the motor with a high accuracy. Thus, the assembly process becomes very difficult.

On the contrary, the technique of Japanese Unexamined Patent Publication No. 2002-296480 wherein the nut member (nut plate) and the lens holding frame are separated, is advantageous in that there is little influence caused by the above-mentioned deviation. In this technique, however, the nut plate must be prevented from rotating. To this end, a through hole, which is formed at the nut plate, is slidably fitted around the guide shaft. In this case, the nut plate is threadedly coupled, at one end thereof, to the lead screw, and is fitted, at the other end thereof, around the guide shaft, so that the assembly of the nut plate requires much trouble. Also, it is unsuitable to implement an automatic assembly process.

Meanwhile, since there is a gap between the fitting portion of the nut plate and the guide shaft, even though the gap is slight, the nut plate momentarily performs a slight movement as the portion of the nut plate threadedly coupled to the lead screw functions as a rotation center when the motor operates initially. In this connection, since the lens holding frame is urged against the nut plate by the elastic urging force of the elastic urging means, an increase in friction loss may occur due to the slight movement, depending on the surface accuracy of the nut plate and lens holding frame at the contact portions thereof.

SUMMARY OF THE INVENTION

Therefore, it is an object of the invention to provide an optical unit capable of being easily assembled, enabling its optical element to smoothly move, and preventing friction loss from being generated around its nut member.

The invention is applied to an optical module for moving an optical element holder, which supports an optical element having an optical axis and is movable along a guide member, in an extension direction of the optical axis, using a nut member integrally provided at the holder, and a lead screw threadedly coupled to the nut member to rotate forward and backward by a driving unit.

In order to solve the above problems, in accordance with the invention, the forward or backward rotation of the motor is transmitted to the lead screw via a reduction gear train. The lead screw is installed to be inclinedly movable with respect to the extension direction of the optical axis about threaded coupling portions of a threaded section of the lead screw and the nut.

In the invention, the lead screw, which is arranged outside the driving unit, is connected to the driving unit via a transmission. The lead screw is also installed to be inclinedly movable about the threaded coupling portions of the threaded section of the lead screw and the nut mounted to the optical element holder. Accordingly, the lead screw is freely inclinedly moved in accordance with the position and parallelism deviations of the lead screw with reference to the guide member when the optical element holder is moved along the guide member in accordance with rotation of the lead screw. Adverse affects caused by the deviations is suppressed. Also, the attachment accuracy of the driving unit does not contribute to the generation of the above-described deviation. Since the nut member is integrated with the optical element holder, there is no frictional loss between the nut member and the optical element holder when the optical element holder moves along the guide member.

In a preferred embodiment of the invention, the optical module comprises a thrust bearing which supports one end of the lead screw, and elastic urging means which urges the lead screw against the thrust bearing. In this embodiment, the lead screw can be supported not only by the threaded coupling portions of the lead screw and nut member, but also by the thrust bearing. Also, the lead screw is biased to one side at the side of the thrust bearing. Accordingly, it is possible to suppress the lead screw from rocking axially.

In a preferred embodiment of the invention, the lead screw has a small-diameter end section centrally protruded from the central portion of a surface of the lead screw supported by a thrust bearing surface of the thrust bearing. The thrust bearing has a radial bearing hole defined by a radial bearing surface at a central portion of the thrust bearing. The small-diameter end section is movably received in the radial bearing hole. In this embodiment, when the lead screw has been inclinedly moved while rotating, the lead screw is also supported in a radial direction. Accordingly, the rotation of the lead screw in the inclinedly moved state is stabilized.

Also, in a preferred embodiment of the invention, the optical module comprises a thrust bearing which supports the lead screw, a radial bearing which supports the lead screw, and elastic urging means which urges the lead screw against the thrust bearing. In this embodiment, the lead screw can be supported not only by the threaded coupling portions of the lead screw and nut member, but also by the thrust bearing. Also, the lead screw is biased to one side at the side of the thrust bearing. Accordingly, it is possible to suppress the lead screw from rocking axially and radially.

In a preferred embodiment of the invention, the small-diameter end section extends through the thrust bearing. The thrust bearing has a recess formed to be joined to the radial bearing hole at an end of the thrust bearing positioned opposite to the thrust bearing surface such that the radial bearing surface is interposed between the thrust bearing end and the thrust bearing surface. The recess has a diameter larger than a diameter of the radial bearing hole. In this embodiment, it is possible to prevent the small-diameter end section of the lead screw extending through the radial bearing hole of the thrust bearing from coming into contact with portions other than the radial bearing surface of the thrust bearing when the lead screw moves inclinedly, and thus, from interfering with the inclined movement of the lead screw. Also, in a preferred embodiment, the transmission comprises a reduction gear train. The reduction gear train comprises an input gear and a final gear mounted to the lead screw and meshed with the input gear. The final gear has a meshing depth larger than a movement amount of the final gear generated when the lead screw carries out a maximal inclined movement. In this embodiment, even when the lead screw carries out a maximal inclined movement, there is no occasion that the meshing between the final gear and the input gear thereof is released. Thus, the rotation of the driving unit is reliably transmitted to the lead screw to move the optical element holder.

Also, in a preferred embodiment of the invention, each of the threaded section of the lead screw and the nut member comprises triangular or trapezoidal threads. In this embodiment, since each thread has an inclined surface, the elastic urging force of the elastic urging means is divided into radial and axial components at the inclined surfaces of the threads, under the condition in which a coupling gap is defined between the threaded section and the nut member. Accordingly, it is possible to enhance the centering accuracy of the lead screw with respect to the nut member.

Also, in a preferred embodiment, the nut member is press-fitted in the optical element holder. The optical module comprises a fixed member facing the nut member in the extension direction of the optical axis, and an elongated protrusion formed at one of the nut member and the fixed member to extend toward the other one of the nut member and the fixed member. The elongated protrusion determines a maximal movement amount of the optical element holder. In this embodiment, when the optical element holder moves maximally, the elongated protrusion comes into contact with the fixed member or nut member. Accordingly, there is no occasion that the nut member is separated from the optical element holder by a force which may be applied to the nut member when a rotating force is further applied to the lead screw under the condition in which the optical element holder is in a stopped state after the maximal movement thereof.

Also, in a preferred embodiment, the optical module comprises a gear arranged between a portion of the lead screw supported on and contacting the radial bearing and the nut member such that the gear rotates together with the lead screw. In this embodiment, it is possible to reduce the rocking of the meshed portion of the gear caused by an inclined movement of the lead screw, and thus, to reduce the possibility that the meshed state of the gear is released.

Also, in accordance with the invention, an optical module comprises: an optical element which has an optical axis, and is movable in an extension direction of the optical axis; an optical element holder which has a nut member integrally formed therewith and supports the optical element; a guide member which guides the optical element holder to be movable in the extension direction of the optical axis; a lead screw which has a threaded section and is supported to the optical member holder by threadedly coupling the threaded section with the nut member; a driving unit; and a transmission which transmits forward and backward rotation of the driving unit to the lead screw, the optical module further comprising a butting portion for restricting an operation range of the lead screw in the extension direction of the optical axis within a predetermined amount. In accordance with this invention, it is possible to restrict the operation of the lead screw in a thrust direction within a predetermined range, and thus, to stabilize the behavior of the lead screw.

Also, in a preferred embodiment of the invention, the butting portion has a diameter smaller than an outer diameter of the threaded section about a rotation axis of the lead screw. There may be an occasion that the rotation of the lead screw is suppressed by virtue of friction generated between the butting portion and the threaded section when the butting portion comes into contact with another butting portion in accordance with the rotation of the lead screw, even though such a case is unusual. In this case, however, it is possible to easily release the suppressed condition in accordance with reverse rotation of the lead screw because the butting portion has a diameter smaller than the diameter of the threaded section of the lead screw.

Also, in a preferred embodiment of the invention, the lead screw rotates integrally with a second gear which meshes with a first gear to transmit power. One of the gears has a tooth pitch larger than the predetermined amount.

In accordance with the invention, the lead screw is freely inclinedly moved in accordance with the position and parallelism deviations of the lead screw with reference to the guide member. Accordingly, it is possible to suppress the occurrence of creaking or scratching between the optical element holder and the guide member which guides the optical element holder, and thus, to smoothly move the optical element. Also, the attachment accuracy of the driving unit does not contribute to the generation of the above-described deviations, so that high accuracy is not required for the attachment of the driving unit. Also, since the nut member is integrated with the optical element holder, it is unnecessary to separately install the nut member and the optical element holder. Accordingly, the assembly can be easily achieved. Since the nut member is integrated with the optical element holder, as described above, there is no occasion that frictional loss is generated around the nut member during the movement of the optical element holder along the guide member.

BRIEF DESCRIPTION OF THE DRAWINGS

The above objects, and other features and advantages of the invention will become more apparent after reading the following detailed description when taken in conjunction with the drawings, in which.

DESCRIPTION OF THE PREFERRED EMBODIMENTS

Hereinafter, a first embodiment of the invention will be described with reference to FIGS. 1 to 3.

Figure 1:
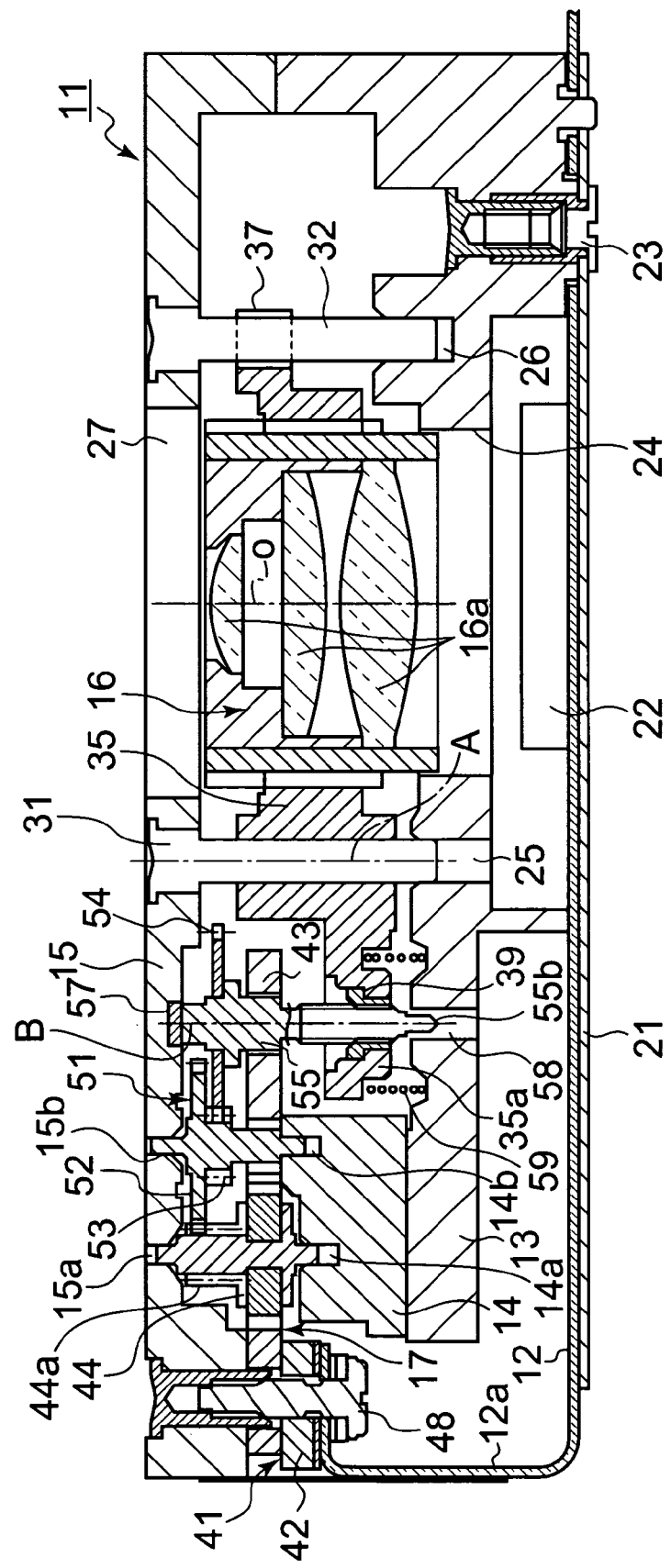
FIG. 1 is a sectional view illustrating a lens driving apparatus according to a first embodiment of the invention.

Referring to FIG. 1, an optical module, for example, a lens driving apparatus, designated by reference numeral 11 is mounted in a portable electronic appliance such as a card type digital camera or a camera-attached portable telephone. FIG. 1 is a cross-sectional view taken along a line F1—F1 in FIG. 3, illustrating the entire portion of the lens driving apparatus 11. The lens driving apparatus 11 includes a circuit board 12, a base member 13, a support block 14, a cover 15, an optical element, for example, a lens barrel 16, and a driving unit 17.

To the back surface of the circuit board 12, a support plate 21 harder than the circuit board 12 is attached in an insulated state. The circuit board 12 has one longitudinal end 12 a bent to extend upwardly from the surface of the circuit board 12, and also to be substantially parallel with the support plate 21. An imaging element 22 such as a CCD or CMOS imaging element is mounted to the surface of the circuit board 12.

The base member 13 has, for example, a rectangular shape, and is fixed to the surface of the circuit board 12. In FIG. 1, reference numeral 23 designates screws threadedly fastened to the base member 13 through the support plate 21 to fix the base member 13. Only one of the screws is representatively illustrated in FIG. 1. A stepped hole 24 is formed on one longitudinal end portion of the base member 13 in order to accommodate the imaging element 22 and to allow arrangement of the lens barrel 16.

The support block 14 is fixed to the other longitudinal end portion of the base member 13. The support block 14, which is a member to support a part of the driving unit 17, functions as a gear support in this embodiment. The support block 14 is made of a non-magnetic material.

The cover 15 is positioned over the base member 13, and is threadedly fastened to the base member 13. The cover 15 is provided, at one end thereof, with a window opening 27 facing the plane of incidence of the lens barrel 16. The other end of the cover 15 covers the support block 14, and functions as a support for supporting a part of the driving unit 17, for example, a gear support.

A plurality of parallel shafts having a circular cross-section, for example, a guide shaft 31 and a rotation stopping shaft 32, are fixed to the cover 15. The guide shaft 31 constitutes a guide member. The rotation stopping shaft 32 also functions as a guide shaft. The guide shaft 31 and rotation stopping shaft 32 are spaced apart from each other by about 180° in the peripheral direction of the window opening 27, and are protruded rearward from the cover 15. The leading end of the guide shaft 31 is inserted into a support hole 25 formed at the base member 13, in a state of being tightly fitted in the support hole 25. Similarly, the leading end of the rotation stopping shaft 32 is inserted into another support hole 26 formed at the base member 13, in a state of being tightly fitted in the support hole 25. In FIGS. 1 and 2, reference character A designates the central axis of the guide shaft 31, that is, the guide member.

The lens barrel 16 includes a plurality of lenses 16a therein. In FIG. 1, reference character 0 designates the optical axis of the lens barrel 16. The central axis A of the guide shaft 31 is designed to be parallel to the optical axis O. A lens barrel holder 35 is threadedly fitted around a peripheral portion of the lens barrel 16. The lens barrel holder 35 is an optical element holder, and is a metal or synthetic resin molded product.

A plurality of sliders, for example, a pair of sliders 36 and 37, are provided at a peripheral portion of the lens barrel holder 35 such that the sliders 36 and 37 are integrated with the lens barrel holder 35. One slider 36 has a hole having a circular cross-section, and is slidably fitted to the periphery of the guide shaft 31 which extends through the hole. The other slider 37 has a U-shaped groove, and is fitted to the periphery of the rotation stopping shaft 32 which extends through the U-shaped groove. Accordingly, the lens barrel 16 is supported between the guide shaft 31 and the rotation stopping shaft 32 so as to face the imaging element 22. In the supported state, the lens barrel 16 is movable in a direction that the lens barrel 16 comes into contact with or moves away from the imaging element 22, that is, an extension direction of the optical axis O (optical axis direction). In accordance with this movement, focus adjustment of the lens barrel 16 with respect to the imaging element 22 is carried out.

Figure 2:
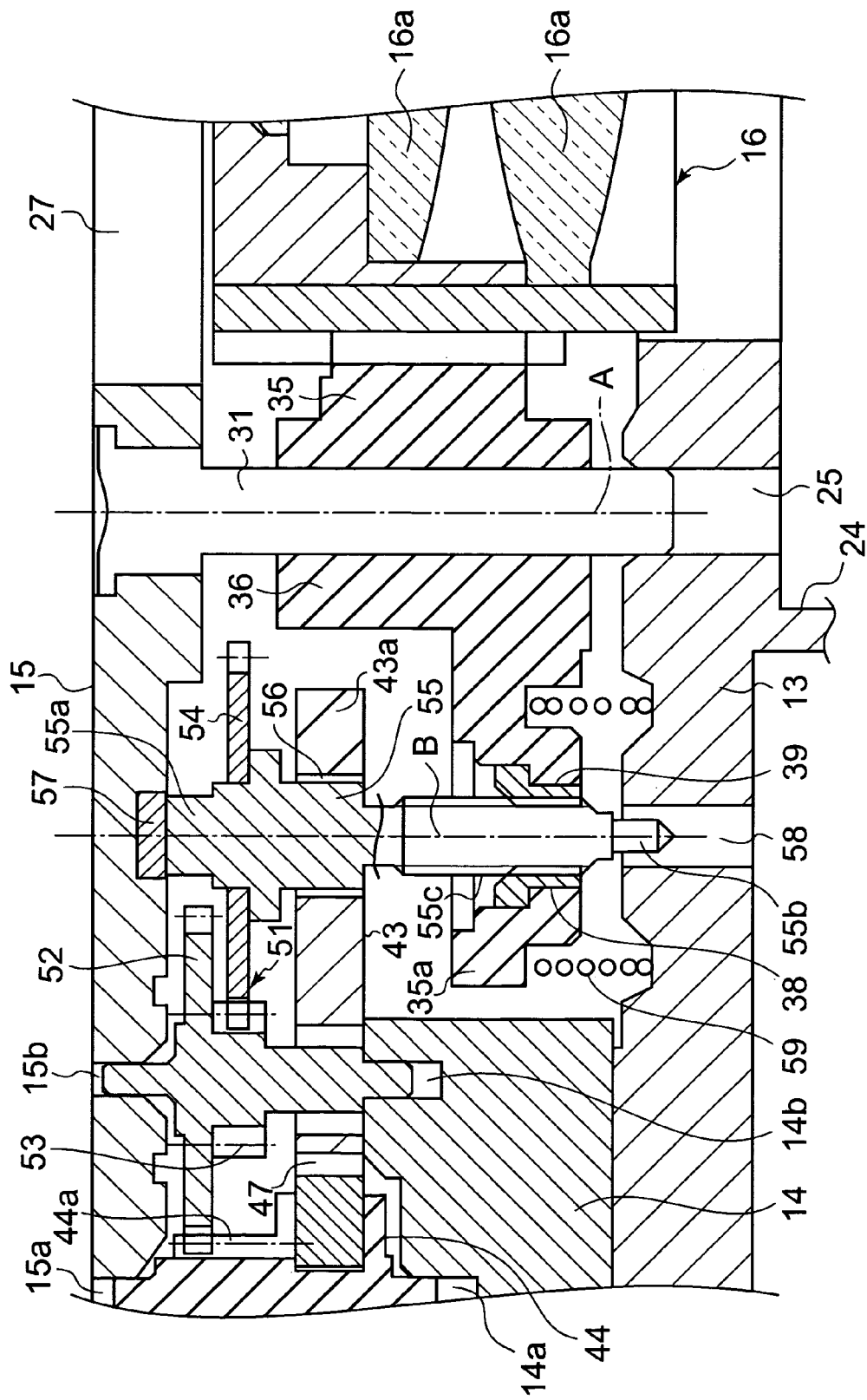
FIG. 2 is an enlarged sectional view illustrating a part of the lens driving apparatus of FIG. 1.
Figure 3:
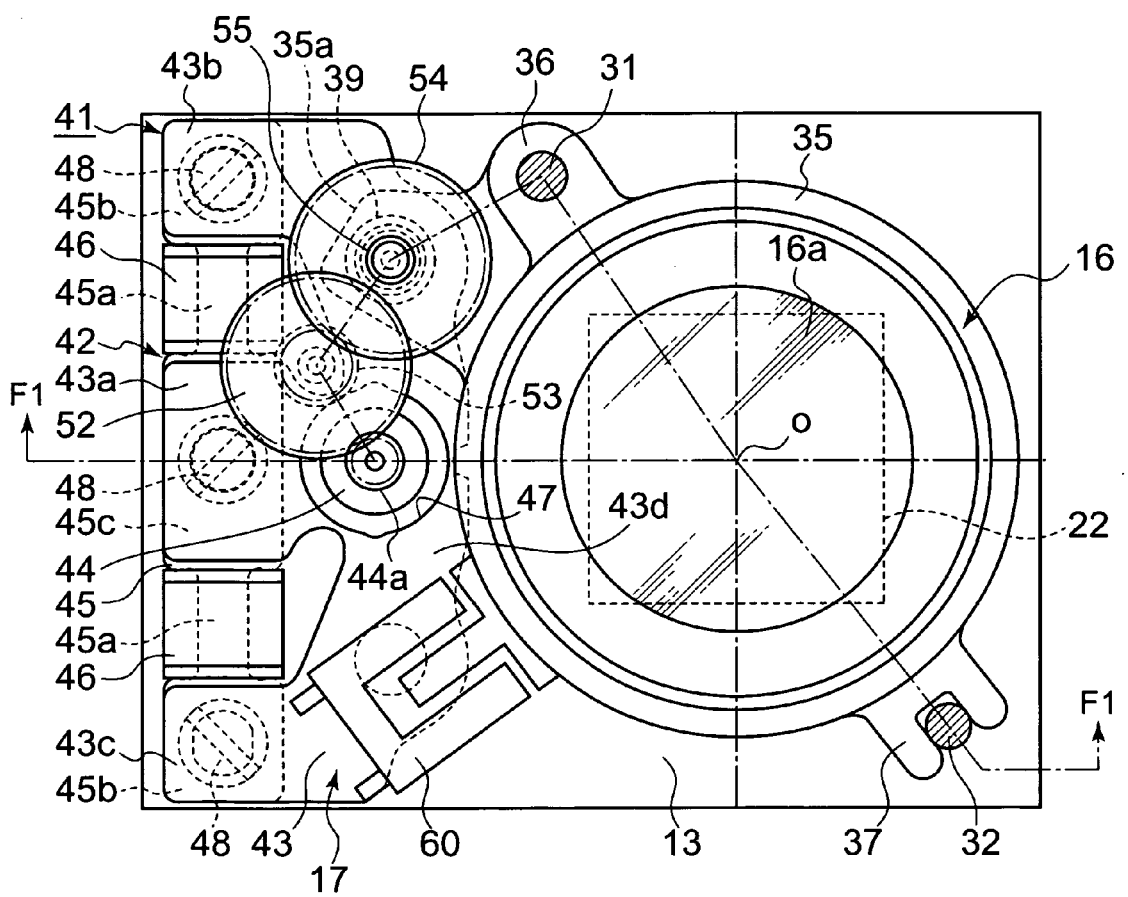
FIG. 3 is a plan view illustrating the lens driving apparatus of FIG. 1 in a state in which its cover and its gear seat are removed.

As shown in FIGS. 1 to 3, the lens barrel holder 35 has an extension 35a integrated with the peripheral portion of the lens barrel holder 35 and the slider 36. A nut member is integrally formed at the extension 35a. That is, in this embodiment, a nut fixing hole 38 having a stepped structure is formed through the extension 35a to extend in the thickness direction of the extension 35a. A nut 39, which constitutes the nut member, is fixed in the nut fixing hole 38.

In this case, the nut 39 is made of metal, and has a jaw 39a. The jaw 39a is press-fitted into the nut fixing hole 38 through a large-diameter opening end of the nut fixing hole 38 until the jaw 39a is positioned on a step of the nut fixing hole 38. The peripheral portion of the jaw 39a is finished to have a roulette surface. The roulette penetrates the lens barrel holder 35 in accordance with the press-fitting of the nut 39, thereby preventing the nut 39 from being unfastened in a rotation direction of the lead screw 55 when the lead screw 55 rotates. The nut 39 fixed to the lens barrel holder 35 in accordance with the press-fitting is received within the thickness of the extension 35a. The female threaded part of the nut 39 has threads having a triangular or trapezoidal cross-section. Accordingly, the nut 39 is a triangular or trapezoidal thread member.

In the invention, the nut member also includes an embodiment wherein thread grooves are formed directly on the extension 35a using a cutting process. The metal nut 39 may be integrated with the lens barrel holder 35 using an insert molding process, or a bonding process.

The driving unit 17 includes a driver, for example, an electric motor, in particular, a stepping motor 41, and a transmission, for example, a reduction gear train 51.

The stepping motor 41 may be a 2-pole motor having a step angle of 180°. As shown in FIGS. 1 and 3, the stepping motor 41 includes a pair of coil blocks 42, a yoke 43, and a rotor 44. The coil blocks 42 and yoke 43 constitute a stator.

Each coil block 42 includes an iron core 45 and an exciting coil 46. The iron core 45 includes a core portion 45a, and yoke connecting portions 45b and 45c respectively formed at opposite longitudinal ends of the core portion 45a. The yoke connecting portion 45c is shared by the coil blocks 42 so as to integrate the coil blocks 42. Thus, the iron core 45 has a structure where in the yoke connecting portions 45b are arranged at opposite sides of the yoke connecting portion 45c via respective core portions 45a. Each exciting coil 46 is wound around an associated one of the core portions 45a.

The yoke 43, which guides magnetic flux generated in accordance with excitation of the exciting coils 46, has a flat plate shape. The yoke 43 has an end 43a, and a pair of ends 43b and 43c. The paired ends 43b and 43c are connected to the yoke connecting portions 45b, respectively. The end 43a, which is positioned between the paired ends 43b and 43c, is connected to the yoke connecting portion 45c. The portion of the yoke 43, except for the ends 43a to 43c, namely, a magnetic path portion 43d, is protruded laterally from the coil block 42 without overlapping with the coil block 42. A rotor receiving hole 42 is formed at the magnetic path portion 43d. A rotor 44 is arranged in the rotor receiving hole 47. The outer peripheral portion of the rotor 44 is magnetized at predetermined regions arranged along the periphery of the rotor 44 such that adjacent ones of the predetermined regions have different polarities, respectively.

Accordingly, the stepping motor 41 rotates through a step angle of 180° in accordance with a magnetic effect generated due to a polarity (S-polarity or N-polarity) exhibited at predetermined regions of the wall defining the rotor receiving hole 47 every time a driving pulse is applied to the exciting coil 46 of the stepping motor 41 via a motor driver (not shown).

The coil blocks 42 of the stepping motor 41 are fixed to the back surface of the cover 15. The magnetic path portion 43d of the yoke 43 is supported by the support block 14. In FIGS. 1 and 3, reference numeral 48 designates screws for fixing the stepping motor 41 to the cover 15, and also functioning as a connector for the coil blocks 42 and yoke 43. The screws 48 also fastens one end 12a of the circuit board 12, so that wiring of motor leads extending between the circuit board 12 and the exciting coils 46 can be easily achieved.

The rotor 44 of the stepping motor 41 is fitted, at one end thereof, in a first bearing hole 14a formed in the support block 14, and is fitted, at the other end thereof, in a first bearing hole 15a formed in a portion of the cover 15 serving as a gear support. Accordingly, the rotor 44 is supported to be freely rotatable. A drive gear 44a is provided at the periphery of a shaft part of the rotor 44. The drive gear 44a is formed integrally, for example, with the shaft part of the rotor 44. Of course, the drive gear 44a may be separately prepared. In this case, the drive gear 44a is fitted around the shaft part of the rotor 44.

The reduction gear train 51 includes a plurality of reduction gears each comprising a spur gear, for example, first through third reduction gears 52 to 54. The first reduction gear 52 is fitted, at one end thereof, in a second bearing hole 14b formed in the support block 14, and is fitted, at the other end thereof, in a second bearing hole 15b formed in the portion of the cover 15 serving as the gear support. Accordingly, the first reduction gear 52 is supported to be freely rotatable. The first reduction gear 52 is meshed with the drive gear 44a. The second reduction gear 53 has a diameter smaller than that of the first reduction gear 52, and has the same central axis as the first reduction gear 52. The second reduction gear 53 is formed integrally with the first reduction gear 52. The third reduction gear 54 constitutes a final gear of the reduction gear train 51. The third reduction gear 54 is meshed with the second reduction gear 53, so that the second reduction gear 53 functions as an input gear for the third reduction gear 54.

As shown in FIG. 3, the reduction gear train 51, except for a part of the third reduction gear 54, is arranged within a region where the stepping motor 41 is projected. Accordingly, it is possible to suppress the stepping motor 41 and lens barrel 61 from being greatly spaced away from each other due to the arrangement space of the reduction gear train 51, and thus, to promote the compactness of the entire portion of the lens driving apparatus 11. The third reduction gear 54 is arranged over the extension 35a of the lens barrel holder 35, as shown in FIG. 2.

The final gear, namely, the third reduction gear 54, is connected to one end section 55a of the lead screw 55. The third reduction gear 54 may be formed integrally with the lead screw 55. The lead screw 55 is made of a metal or synthetic resin material, and the end section 55a thereof has a flat end surface. The lead screw 55 has a first small-diameter end section 55b at an end thereof opposite to the end section 55a. The first small-diameter end section 55b is a minimal diameter portion of the lead screw 55. The lead screw 55 is provided with a threaded section 55c arranged near the first small-diameter end section 55b. The threaded section 55c has threads having a triangular or trapezoidal cross-section. Accordingly, the threaded section 55c is a triangular or trapezoidal screw.

As shown in FIG. 2, the threaded section 55c arranged at the axial intermediate portion of the lead screw 55 is threadedly coupled to the nut 39. Accordingly, the lead screw 55 is inclinedly movable with respect to the optical axis direction in a state in which the threaded coupling portions between the threaded section 55c and the nut 39 function as support points. Here, "inclined movement" means that the central axis B of the lead screw 55 is not parallel with the central axis A of the guide shaft 31 constituting the guide member, but is moved about the threaded coupling portions, so as to be inclined with respect to the central axis A. As will be described hereinafter, the inclined movement is possible because there is a minute diametrical gap, caused by a general meshing tolerance, between the threaded coupling portions, under the condition in which at least one axial end, preferably, both axial ends, of the lead screw 55 is not prevented from moving in a radial direction.

The magnetic path portion 43d of the yoke 43 fastened to the back surface of the cover 15 functions as a fixed member. The magnetic path portion 43d of the yoke 43 has an area facing the extension 35a to which the nut 39 is fixed. A through hole 56 is formed in the magnetic path portion 43d. The lead screw 55 extends through the through hole 56. The portion of the lead screw 55 extending through the through hole 56 has a diameter smaller than that of the through hole 56, so that a gap is defined between the lead screw section and the through hole 56 to allow inclined movement of the lead screw 55. The meshing depth of the third reduction gear 54 rotating integrally with the lead screw 55 and the second reduction gear 53 meshed with the third reduction gear 54 is set to be greater than the movement amount of the third reduction gear 54 when the lead screw 55 carries out a maximal inclined movement. Accordingly, even when the lead screw 55 carried out a maximal inclined movement, there is no occasion that the meshing between the third reduction gear 54 and the input gear thereof, namely, the second-reduction gear 53, is released. Thus, the rotating power of the stepping motor 41 is reliably transmitted to the lead screw 55 to move the lens barrel holder 35 as will be described hereinafter. As shown in FIGS. 1 and 2, one end section 55a of the lead screw 55 is in contact with a thrust bearing 57 attached to the back surface of the cover 15, so that the end section 55a is supported by the thrust bearing 57. This support is implemented only to limit movement of the lead screw 55 in a direction in which the lead screw 55 extends through the cover 15 from the back surface of the cover 15, but to allow movement of the lead screw 55 in a direction perpendicular to the axial direction of the lead screw 55. The first small-diameter end section 55b of the lead screw 55 is received in a recess 58 formed in the base member 13 in the form of, for example, a hole. The recess 58 has a diameter larger than that of the first small-diameter end section 55b, so as to allow movement of the first small-diameter end section 55b in the recess 58 in a direction perpendicular to the axial direction of the lead screw 55.

The lead screw 55 is urged against the thrust bearing 57 by, for example, the elastic force of a coil spring 59. The coil spring 59, which constitutes urging means, is interposed between the back surface of the extension 35a and the base member 13. Accordingly, the coil spring 59 urges the lead screw 55 against the thrust bearing 57 via the lens barrel holder 35. In this case, the spring force of the coil spring 59 is mainly applied to a thrust stopper of the extension 35a to the nut 39, namely, the back surface of the jaw 39a of the nut 39 in this embodiment, to bias the lead screw 55 in a thrust direction via the nut 39. Accordingly, there is no possibility that the nut 39 is separated from the lens barrel holder 35 due to the spring force. In FIG. 3, reference numeral 60 designates a position sensor for detecting a moved position of the lens barrel 16.

When the stepping motor 41 rotates forward or backward in accordance with application of a predetermined number of drive pulses to the stepping motor 41, the rotation of the rotor 44 is transmitted to the lead screw 55 after being speed-reduced by the reduction gear train 51. As a result, the lead screw 55 is rotated. Since the nut 39, to which the threaded section 55c of the lead screw 55 is threadedly coupled, is integrated with the lens barrel holder 35 obstructed from rotating by the guide shaft 31 and rotation stopping shaft 32, the rotating movement of the lead screw 55 is changed to a rectilinear movement of the lens barrel holder 35 in a thickness direction, namely, the extension direction of the optical axis O (optical axis direction). Accordingly, the lens barrel holder 35 moves while sliding along the guide shaft 31 and rotation stopping shaft 32. Thus, operation for focusing the lenses 16a held by the lens barrel holder 35 with respect to the imaging element 22 is carried out.

In the lens driving apparatus 11 operating in the above-described manner, it is ideal that there is no parallelism and position deviation between the central axis B of the lead screw 55 moving the lens barrel holder 35 to be extended or retracted with respect to the imaging element 22 and the central axis A of the guide axis 31 guiding the movement of the lens barrel holder 35 at a position near the lead screw 55. However, practically, there may be a parallelism or position deviation between the central axes A and B due to a dimension deviation or assembly accuracy deviation of each element within a certain tolerance, adjustment of the optical axis O, or the like.

Even in such a case, in the lens driving apparatus 11, the lead screw 55 is arranged to be inclinedly movable about the threaded coupling portion thereof to the nut 39 without being fixed at the opposite ends of the lead screw 55 such that the lead screw 55 cannot move, as described above. As a result, when the lens barrel holder 35 is moved along the guide shaft 31 or the like in accordance with rotation of the lead screw 55, the lead screw 55 is freely inclinedly moved in accordance with the position and parallelism deviations of the lead screw 55 with reference to the guide shaft 31. Accordingly, it is possible to suppress adverse affects caused by the position and parallelism deviations between the lead screw 55 and the guide shaft 31, that is, the occurrence of creaking or scratching between the optical element holder and the guide member which guides the optical element holder. Thus, the lenses 16*a* can be smoothly moved together with the lens barrel holder 35.

Positioning of the lenses 16*a* can be achieved with a high accuracy by virtue of the following reason. That is, in the lens driving apparatus 11 having the above-described configuration, the lead screw 55 is urged against the thrust bearing 57 supporting one end of the lead screw 55 by the coil spring 59. Therefore, the lead screw 55 is not only threadedly coupled with the nut 39, but also is supported by the thrust bearing 57. Accordingly, the lead screw 55, which is inclinedly movable, is maintained in a stable state without rocking unintentionally. Also, since the lead screw 55 is biased to the thrust bearing 57 by the urging force, it is possible to suppress the lead screw 55 from rocking in the extension direction of the central line B thereof, namely, the optical axis direction. Thus, an enhancement in the positional accuracy of the lens barrel 16 supporting the lens 16*a* in the optical axis direction can be achieved.

Also, since triangular or trapezoidal threads are used for the threaded section 55*c* of the lead screw 55 and the nut 39, the spring force of the coil spring 59 is divided into radial and axial components at the inclined surfaces of the threads of the threaded section 55*c* and nut 39. Accordingly, it is possible to enhance the centering accuracy of the lead screw 55 with respect to the nut 39 using a meshing gap defined between the threaded section 55*c* and the nut 39, together with the components of the spring force. Thus, the positional accuracy of the lens barrel 16 supporting the lenses 16*a* can be enhanced.

In the lens driving apparatus 11 having the above-described configuration, the lead screw 55 is not directly connected to the stepping motor 41, but is connected to the stepping motor 41 via the reduction gear train 51. Accordingly, the attachment accuracy of the stepping motor 41 does not contribute to the generation of the above-described deviation. Therefore, high accuracy is not required for the attachment of the stepping motor 41, so that it is possible to easily achieve the installation of the stepping motor 41. Also, high accuracy is not required for the positioning of the lead screw 55 and the parallelism of the central axis B with respect to the guide shaft 31 because the lead screw 55 is threadedly coupled to the nut 39 such that the lead screw 55 is inclinedly movable. Accordingly, the installation of the lead screw 55 can be easily achieved. Furthermore, since the nut 39 is mounted in the lens barrel holder 35 such that they are integrated, it is unnecessary to separately install the nut 39 and lens barrel holder 35. Accordingly, the installation can be easily achieved. In this embodiment, the screws 23 and 48, and elements, except for the circuit board 12, in which the imaging element 22 has been mounted, can be assembled as being upwardly installed on the base member 13 in a sequential manner. Accordingly, this embodiment is suitable for automatic assembly. Thus, the lens driving apparatus 11 can be easily assembled.

Also, since the nut 39 is fixed to the lens barrel holder 35 such that they are integrated, as described above, there is no occasion that the nut 39 is moved with respect to the lens barrel holder 35 during movement of the lens barrel holder 35 along the guide shaft 31 in the focusing operation. Accordingly, there is no frictional loss between the nut 39 and the lens barrel holder 35. Also, it is possible to reduce the driving force (torque) of the stepping motor 41.

Figure 4:
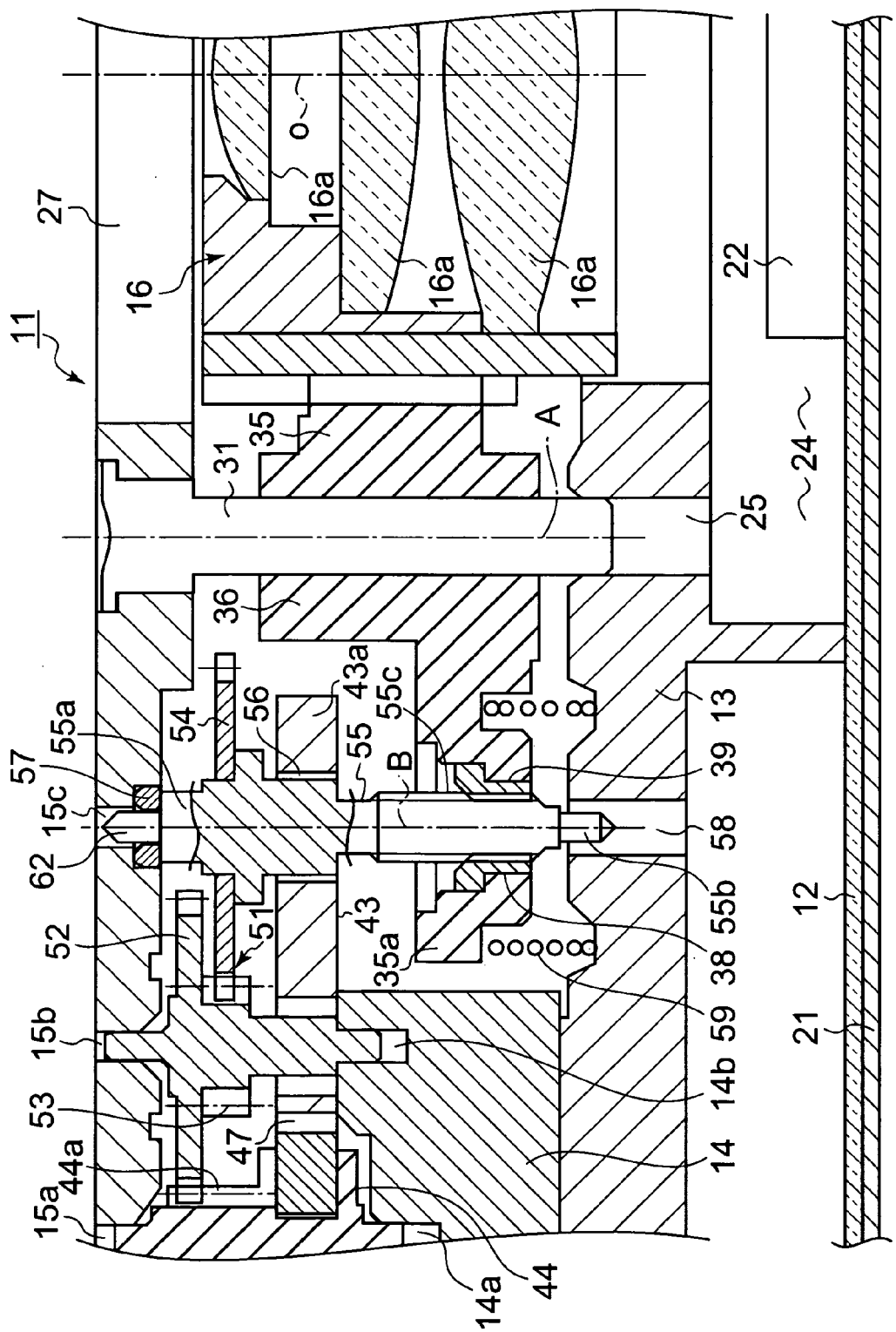
FIG. 4 is an enlarged sectional view illustrating a part of a lens driving apparatus according to a second embodiment of the invention.
Figure 5A:
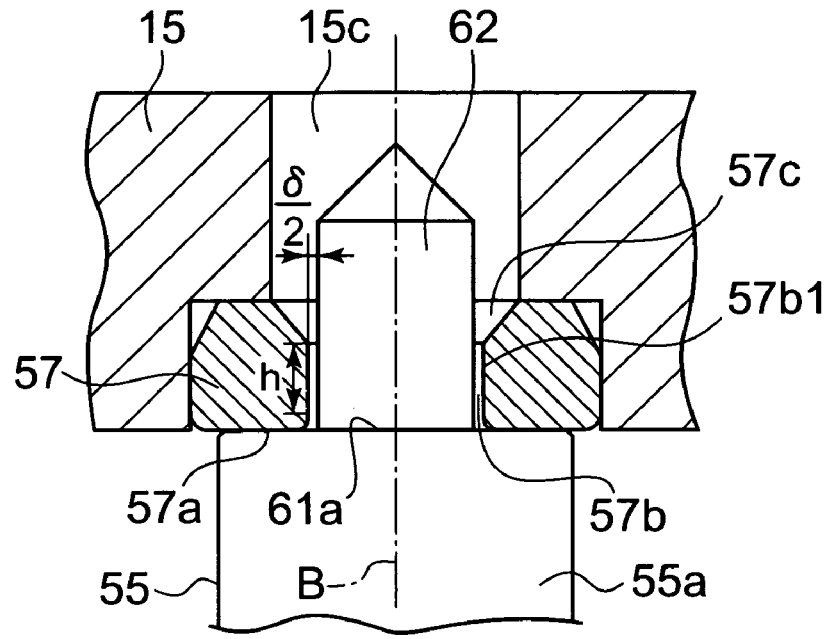
FIGS. 5A and 5B are sectional views illustrating the periphery of a thrust bearing included in the lens driving apparatus of FIG. 4 in different states, respectively.
Figure 5B:
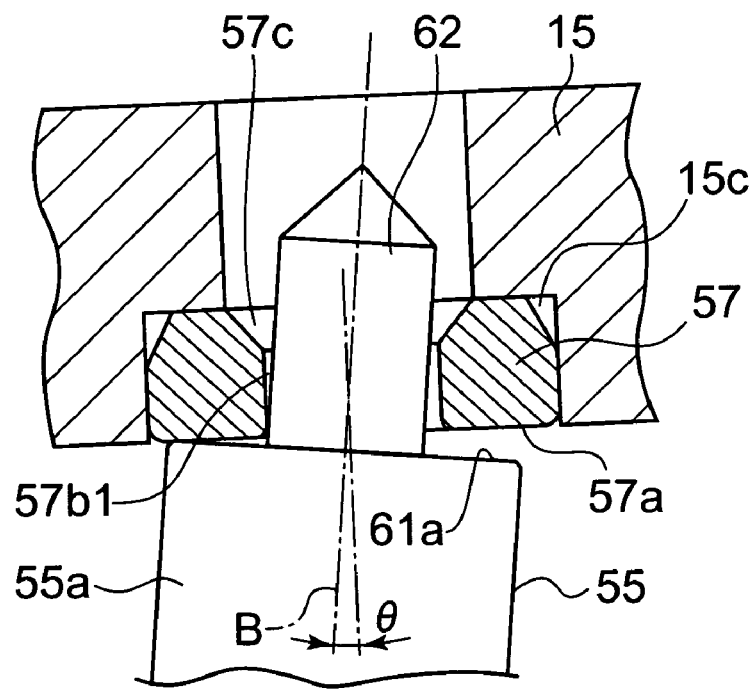

FIGS. 4, 5A and 5B illustrate a second embodiment of the invention. Basically, this embodiment is identical to the first embodiment. Accordingly, elements of the second embodiment identical to those of the first embodiment are designated by the same reference numerals, respectively, and no description thereof will be given. The second embodiment is different from the first embodiment in terms of the structure of one end section 55*a* of the lead screw 55 and the structure of the thrust bearing 57 supporting the end section 55*a*.

In detail, the end section 55*a* of the lead screw 55 has a contact surface 61, and a second small-diameter end section 62. The contact surface 61 is flat to form a shoulder surface of the end section 55*a*. The contact surface 61 is in contact with the thrust bearing surface 57*a* of the thrust bearing 57*a*, so as to be supported by the thrust bearing surface 57*a*. The second small-diameter end section 62 is integrally protruded from a central portion of the contact surface 61. The second small-diameter end section 62 has a circular cross-section.

The thrust bearing 57 has a ring shape, and includes a thrust bearing surface 57*a*, a radial bearing hole 57*b*, and a recess 57*c*, as shown in FIGS. 5A and 5B. The radial bearing hole 57*b*, which is arranged at a central portion of the thrust bearing 57, has a diameter larger than that of the second small-diameter end section 62. The radial bearing hole 57*b* is defined by a radial bearing surface 57*b*1. The radial bearing surface 57*b*1 is connected to the thrust bearing surface 57*a* in a direction normal to the thrust bearing surface 57*a*. The recess 57*c* is defined by a round concave portion formed to be joined to the radial bearing hole 57*b* at an end of the thrust bearing 57 arranged opposite to the thrust bearing surface 75*a* such that the radial bearing surface 57*b* is interposed between the thrust bearing end and the thrust bearing surface 75*a*. The recess 57*c* has a diameter larger than that of the radial bearing hole 57*b*, for example, the diameter increasing gradually as the recess 57*c* extends away from the radial bearing hole 57*b*. In place of this structure, a circular hole having no variation in diameter may be formed.

The thrust bearing 57 is press-fixed into a bearing fitting hole 15*c* formed in the cover 15. The bearing fitting hole 15*c* has a large-diameter hole portion and a small-diameter hole portion. The thrust bearing 57 is press-fitted in the large-diameter hole portion. The small-diameter hole portion has a diameter not smaller than the maximal diameter of the recess 57*c*. The lead screw 55 is supported by the thrust bearing 57 as the contact surface 61 is in press contact with the thrust bearing surface 57*a* of the thrust bearing 57, and the second small-diameter end section 62 extends loosely through the radial bearing hole 57*b*. In such a support state, a gap δ allowing an inclined operation of the lead screw 55 is defined between the second small-diameter end section 62 and the radial bearing surface 57*b*1. When it is assumed that "h" represents the height of the radial bearing surface 57*b*1, as shown in FIG. 5A, and "θ" represents an angle corresponding to a maximal inclined movement amount of the lead screw 55, as show in FIG. 5B, the gap δ is set to satisfy the relation of "$\tan\theta < (\delta/h)$". The configurations of the second embodiment other than the above-described configurations are identical to those of the first embodiment.

In the second embodiment, similarly to the first embodiment, the lead screw 55 is freely inclinedly moved in accordance with the position and parallelism deviations of the lead screw 55 with reference to the guide shaft 31 when the lens barrel holder 35 is moved along the guide shaft 31 or the like in accordance with rotation of the lead screw 55 in the operation of focusing the lenses 16*a*. Accordingly, the problems to be solved in the invention can also be solved in the second embodiment.

In this case, since the thrust bearing 57 has the recess 57c, it is possible to prevent the second small-diameter end section 62 of the lead screw 55 extending through the radial bearing hole 57b of the thrust bearing 57 from coming into contact with portions other than the radial bearing surface 57b1 of the thrust bearing 57, and thus, from interfering with the inclined movement of the lead screw 55, as shown in FIG. 5B.

When the lead screw 55 has been inclinedly moved while rotating, the lead screw 55 is supported by the thrust bearing 57 in such a manner that the contact surface 61 comes into contact with the thrust bearing surface 57a, and the second small-diameter end section 62 comes into contact with the radial bearing surface 57b1, as shown in FIG. 5B. Accordingly, the end section 55a of the lead screw 55 is also supported in a radial direction, so that the rotation of the lead screw 55 in the inclinedly moved state is stabilized.

Figure 6:
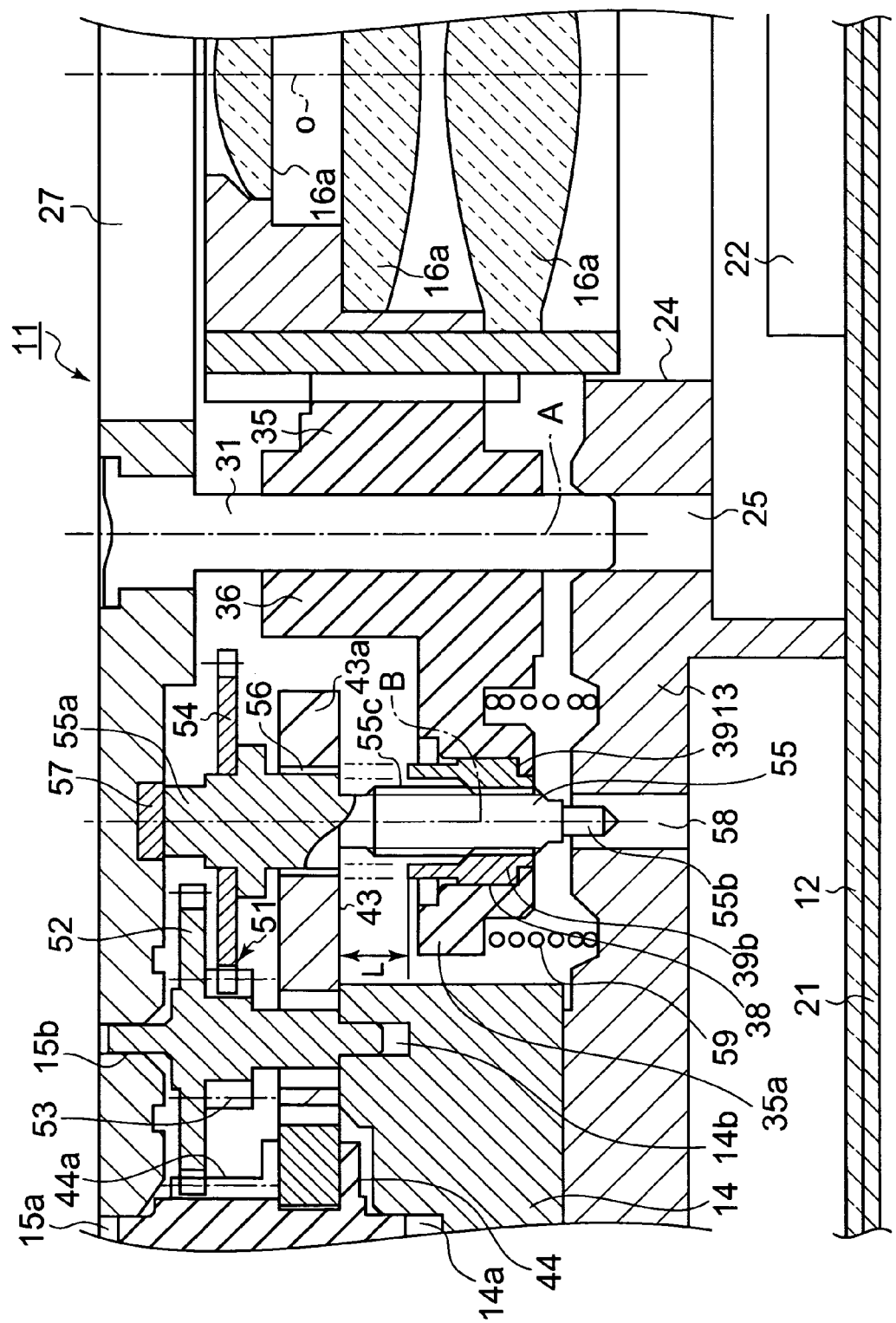
FIG. 6 is an enlarged sectional view illustrating a part of a lens driving apparatus according to a third embodiment of the invention.

FIG. 6 illustrates a third embodiment of the invention. Basically, this embodiment is identical to the first embodiment. Accordingly, elements of the third embodiment identical to those of the first embodiment are designated by the same reference numerals, respectively, and no description thereof will be given. The third embodiment is different from the first embodiment in that the nut 39 integrated with the lens barrel holder 35 contributes to limitation of the maximal movement amount of the lens barrel holder 35.

In detail, the nut 39, which is press-fitted in the extension 35a, includes an annular elongated protrusion 39bb formed integrally with the nut 39 to extend toward the yoke (fixing member) 43 facing the extension 35a. The elongated protrusion 39bb is protruded from the yoke-facing surface of the extension 35a. The elongated protrusion 39bb may come into contact with the yoke 43 when the lens barrel holder 35 has been moved toward the cover 15 side from a reference position (the position of the lens barrel holder 35 determined by the coil spring 59 in a state in which rotating power is not transmitted to the lead screw 55), as indicated by double-dotted lines in FIG. 6. The maximal movement amount L of the lens barrel holder 35 is determined by the gap defined between the leading end of the elongated protrusion 39bb and the yoke 43. The configurations of the third embodiment other than the above-described configurations are identical to those of the first embodiment.

In the third embodiment, similarly to the first embodiment, the lead screw 55 is freely inclinedly moved in accordance with the position and parallelism deviations of the lead screw 55 with reference to the guide shaft 31 when the lens barrel holder 35 is moved along the guide shaft 31 or the like in accordance with rotation of the lead screw 55 in the operation of focusing the lenses 16a. Accordingly, the problems to be solved in the invention can also be solved in the third embodiment.

Meanwhile, during the operation of focusing the lenses 16a while moving the lens barrel holder 35 toward the cover 15, there may be a possibility that the lead screw 55 rotates excessively due to control errors for the stepping motor 41. In this case, when the movement amount of the lens barrel holder 35 reaches a maximal value, the elongated protrusion 39bb of the nut 39 comes into contact with the yoke 43, as indicated by the double-dotted lines in FIG. 6. When the lead screw 55 further rotates under the condition in which further movement of the lens barrel holder 35 is prevented, a force is applied to the nut 39 in a direction that the nut 39 is separated from the lens barrel holder 35. In this embodiment, however, there is no occasion that the nut 39 is separated from the nut fitting hole 38 by the above-described force, because the nut 39 is pressed by the yoke 43 in accordance with the above-described contacting operation. At this time, the rotation of the lead screw 55 is stopped, thereby causing the stepping motor 41 to be locked.

In the third embodiment, in place of the protrusions 39bb formed at the nut 39, an elongated protrusion 39b may be formed which is protruded from the fixing member, namely, the yoke 43, toward the nut 39, or protrusions 39b may be formed which are protruded from both the yoke 43 and the nut 39, in order to limit the maximal movement amount of the holder 35 and to prevent separation of the nut 39 when the lead screw 55 rotates excessively.

Figure 7:
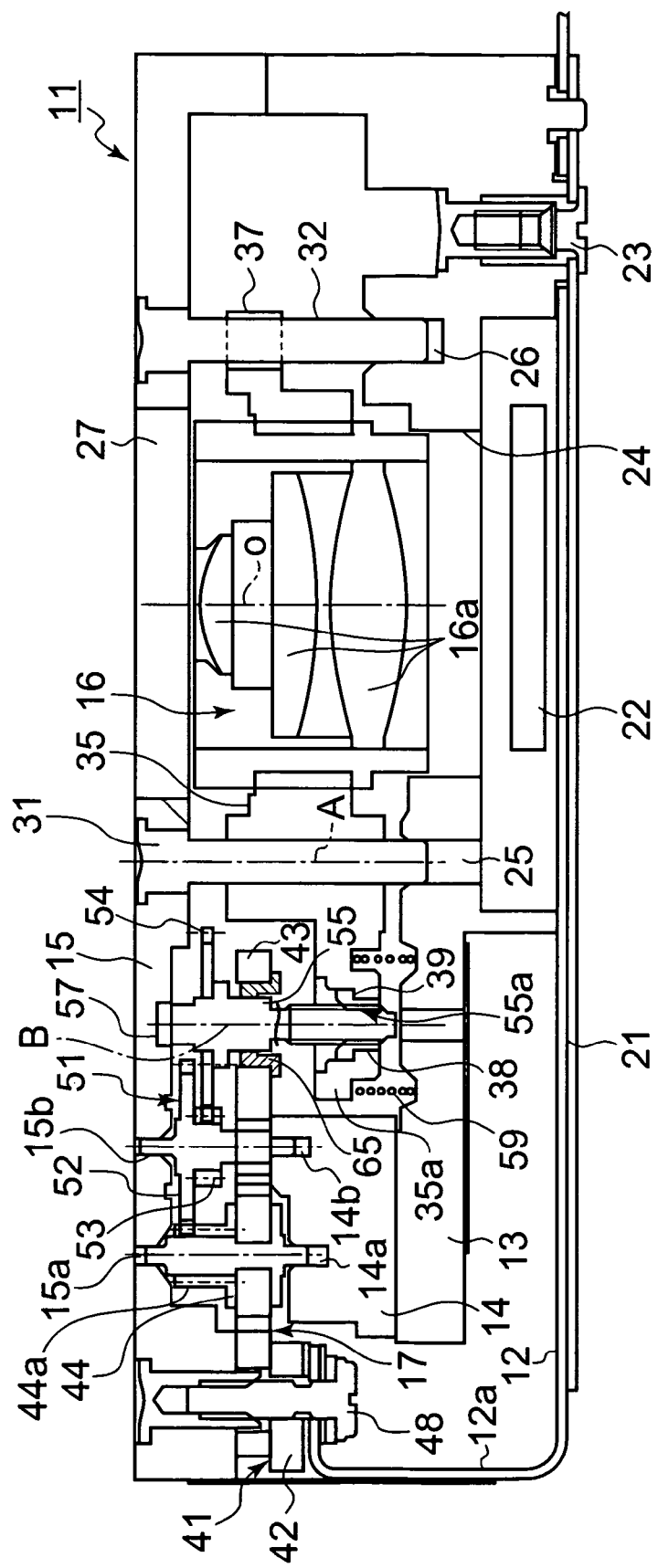
FIG. 7 is a sectional view illustrating a part of a lens driving apparatus according to a fourth embodiment of the invention.

FIG. 7 illustrates a fourth embodiment of the invention. Basically, this embodiment is identical to the first embodiment. Accordingly, elements of the fourth embodiment identical to those of the first embodiment are designated by the same reference numerals, respectively, and no description thereof will be given. The fourth embodiment is different from the first embodiment in that the fourth embodiment includes a configuration capable of supporting the lead screw 55 in a radial direction as well while allowing a predetermined inclined movement of the lead screw 55.

In detail, a screw shaft section of the lead screw 55 arranged between the third reduction gear 54 and the threaded section 55c of the lead screw 55 is radially supported. To this end, in an example of FIG. 7, a radial bearing 65 is attached, as a support element in the radial direction, to the yoke 43 of the stator in a press-fitted manner. The screw shaft section of the lead screw 55 extends through the radial bearing 65.

Also, where an intermediate plate (not shown), through which the screw shaft section extends, is attached to the support block 14 or the like, the radial bearing 65 may be attached to the intermediate plate in a press-fitted manner, in place of the stator. In addition, the intermediate plate itself may be used as the support element, to radially support the screw shaft section which extends through the intermediate plate. The configurations of the third embodiment other than the above-described configurations are identical to those of the first embodiment.

In the fourth embodiment, similarly to the first embodiment, the lead screw 55 is freely inclinedly moved within a limited range in accordance with the position and parallelism deviations of the lead screw 55 with reference to the guide shaft 31 when the lens barrel holder 35 is moved along the guide shaft 31 or the like in accordance with rotation of the lead screw 55 in the operation of focusing the lenses 16a. Accordingly, the problems to be solved in the invention can also be solved in the fourth embodiment. Also, since the inclined movement is limited by the radial bearing 65, it is possible to suppress radial rocking of the lead screw 55 within a predetermined small range. This is effective in suppressing the third reduction gear 54 from being separated from the second reduction gear 53.

Figure 8:
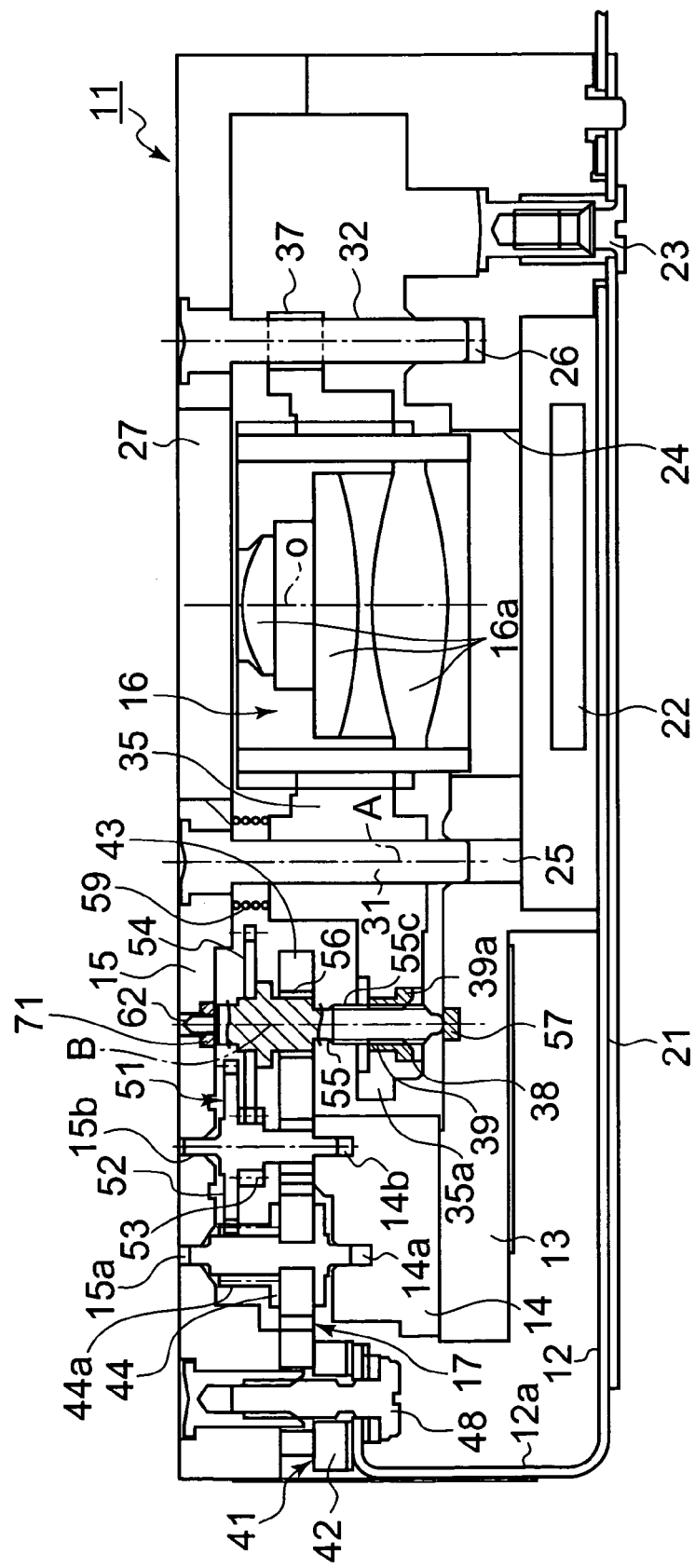
FIG. 8 is a sectional view illustrating a part of a lens driving apparatus according to a fifth embodiment of the invention.

FIG. 8 illustrates a fifth embodiment of the invention. Basically, this embodiment is identical to the first embodiment. Accordingly, elements of the fifth embodiment identical to those of the first embodiment are designated by the same reference numerals, respectively, and no description thereof will be given. The fifth embodiment is different from the first embodiment in that the opposite ends of the lead screw 55 are supported in such a manner that the lead screw 55 is inclinedly movable, and a coil spring 59 is arranged to bias the lead screw 55 in a thrust direction.

In detail, the nut 39 is press-fixed into the extension 35a of the lens barrel holder 35 from the surface side facing the base member 13. The screw 55 extends through the nut 39 such that the threaded section 55c of the lead screw 55 is threadedly coupled with the nut 39. One end of the screw 55 at the side of the threaded section 55c is exposed to the surface of the base member 13, and is supported by a thrust bearing 57 embedded in the base member 13.

A radial bearing 71 is attached to the back surface of the cover 15, in place of the thrust bearing. The structures of the radial bearing 71 and the attachment of the radial bearing 71 to the cover 15 are identical to the related structures of the cover 15 and thrust bearing 57 in the third embodiment shown in FIG. 4, so that no description thereof will be given. The lead screw 55 has a small-diameter end section 62 arranged at the other end of the lead screw 55 at the side of the third reduction gear 54. The small-diameter end section 62 is movably inserted into the radial bearing hole of the radial bearing 71, so that the other end of the lead screw 55 is radially supported. The peripheral surface of the small-diameter end section 62 does not come into sliding contact with the inner surface of the radial bearing hole, and defines a gap therebetween. Also, the shoulder portion of the lead screw 55 formed at the root side of the small-diameter end section 62 does not come into contact with the end surface of the radial bearing 71, and defines a gap therebetween. By virtue of these gaps, the lead screw 55 is allowed to move inclinedly.

The coil spring 59, which functions as urging means for urging the lead screw 55 against the thrust bearing 57, is interposed between the lens barrel 16 and the cover 15 to surround the guide shaft 31. Accordingly, the coil spring 59 urges the lead screw 55 against the thrust bearing 57 at the side of the radial bearing 71. The configurations of the fifth embodiment other than the above-described configurations are identical to those of the first embodiment.

In the fifth embodiment, similarly to the first embodiment, the lead screw 55 is freely inclinedly moved within a limited range in accordance with the position and parallelism deviations of the lead screw 55 with reference to the guide shaft 31 when the lens barrel holder 35 is moved along the guide shaft 31 or the like in accordance with rotation of the lead screw 55 in the operation of focusing the lenses 16a. Accordingly, the problems to be solved in the invention can also be solved in the fifth embodiment. Also, since the inclined movement of the lead screw 55 is limited by the radial bearing 71, it is possible to suppress radial rocking of the lead screw 55 within a predetermined small range. This is effective in suppressing the third reduction gear 54 from being separated from the second reduction gear 53.

Figure 9:
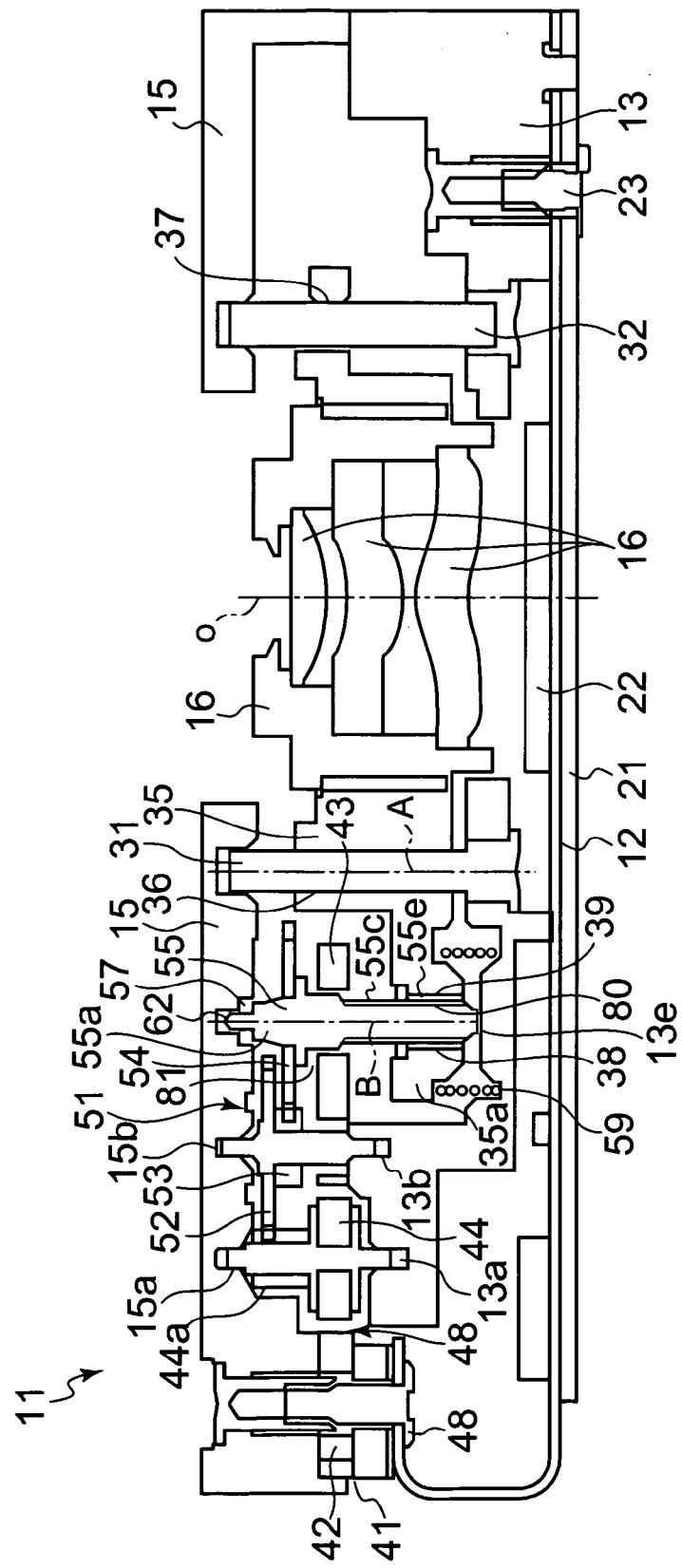
FIG. 9 is a sectional view illustrating a part of a lens driving apparatus according to a sixth embodiment of the invention.

FIG. 9 illustrates a sixth embodiment of the invention. Basically, this embodiment is identical to the first embodiment. Accordingly, elements of the fifth embodiment identical to those of the first embodiment are designated by the same reference numerals, respectively, and no description thereof will be given. The sixth embodiment is different from the first embodiment in terms of the shapes of the opposite ends of the lead screw 55 and in that the support block 14 in the first embodiment is integrated with the base member 13. Similarly to the second embodiment, one end section 55a of the lead screw 55 upwardly urged by the coil spring 59 is supported in both the thrust direction and the radial direction by the thrust bearing 57. A first gap 80 is defined between the base member 13 and the lead screw 55. At a region where the first gap 80 is formed, the base member 13 has a base member butting portion 13e, and the other end of the lead screw 55 has a lead screw butting portion 55e. In this case, the base member butting portion 13e has a flat shape. Also, the lead screw butting portion 55e has a flat shape.

When the lens barrel holder 35 is operated to move, for example, in an upward direction, during operation of the driving module, the lens barrel holder 35 may be moved to a controlled upper limit position in accordance with a control operation using a position sensor or the like in a normal state. However, where there is an error in the control operation, the lens barrel holder 35 may be moved beyond the controlled upper limit position, even though such a case is unusual. In this case, it can be presumed that, when the lead screw 55 further rotates under the condition in which the lens barrel holder 35 has moved to a mechanical upper limit position, for example, a position where the lens barrel holder 35 comes into contact with the cover 15, the lead screw 55 is downwardly moved. In this embodiment, however, the first gap 80 is eliminated in accordance with the downward movement of the lead screw 55, so that the lead screw butting portion 55e comes into contact with the base member butting portion 13e, thereby restricting further operation of the lead screw 55. Here, the first gap 80 is smaller than the pitch of the second reduction gear 53 in a rotation direction, a so-called "tooth pitch". Accordingly, even when the first gap 80 is eliminated in accordance with the axial movement of the lead screw 55, there is no occasion that the meshing between the second reduction gear 53 and the third reduction gear 54 is released. Even when the tooth pitch of the third reduction gear 54 is larger than the first gap 80, the same effect as described above can be obtained.

Also, there may be an occasion that the lead screw 55 and nut 39 are fastened to each other by virtue of friction generated between the butting portions in accordance with the fastening principle of screws. When the operation direction is reversed to downwardly move the lens barrel holder 35 under the fastened condition, a relatively high torque may be needed to release the fastened condition. In this embodiment, the torque needed for the release can be reduced in accordance with a reduction in frictional force caused by a reduction in the diameter of the radial contact surface of the lead screw 55, namely, the lead screw butting portion 55e in this embodiment. In this case, the influence by frictional coefficient deviation is also reduced. Accordingly, it is possible to stably release the fastened condition. In this embodiment, the lead screw butting portion 55e has a diameter smaller than the screw diameter of the lead screw 55.

It is preferred that lubricating means such as oil, grease, or coating be provided at the lead screw butting portion 55e because the lubricating means can stabilize the frictional condition, thereby enabling easy release of the fastened condition.

Also, although the base member butting portion 13e has been illustrated as being integrated with the base member 13, a separate member made of a material exhibiting superior lubrication characteristics may be fixed to the base member 13, as shown in FIG. 8.

It is also preferred that the lead screw butting portion 55e has a spherical shape to have a reduced contact surface, as shown in FIG. 8.

Figure 10:
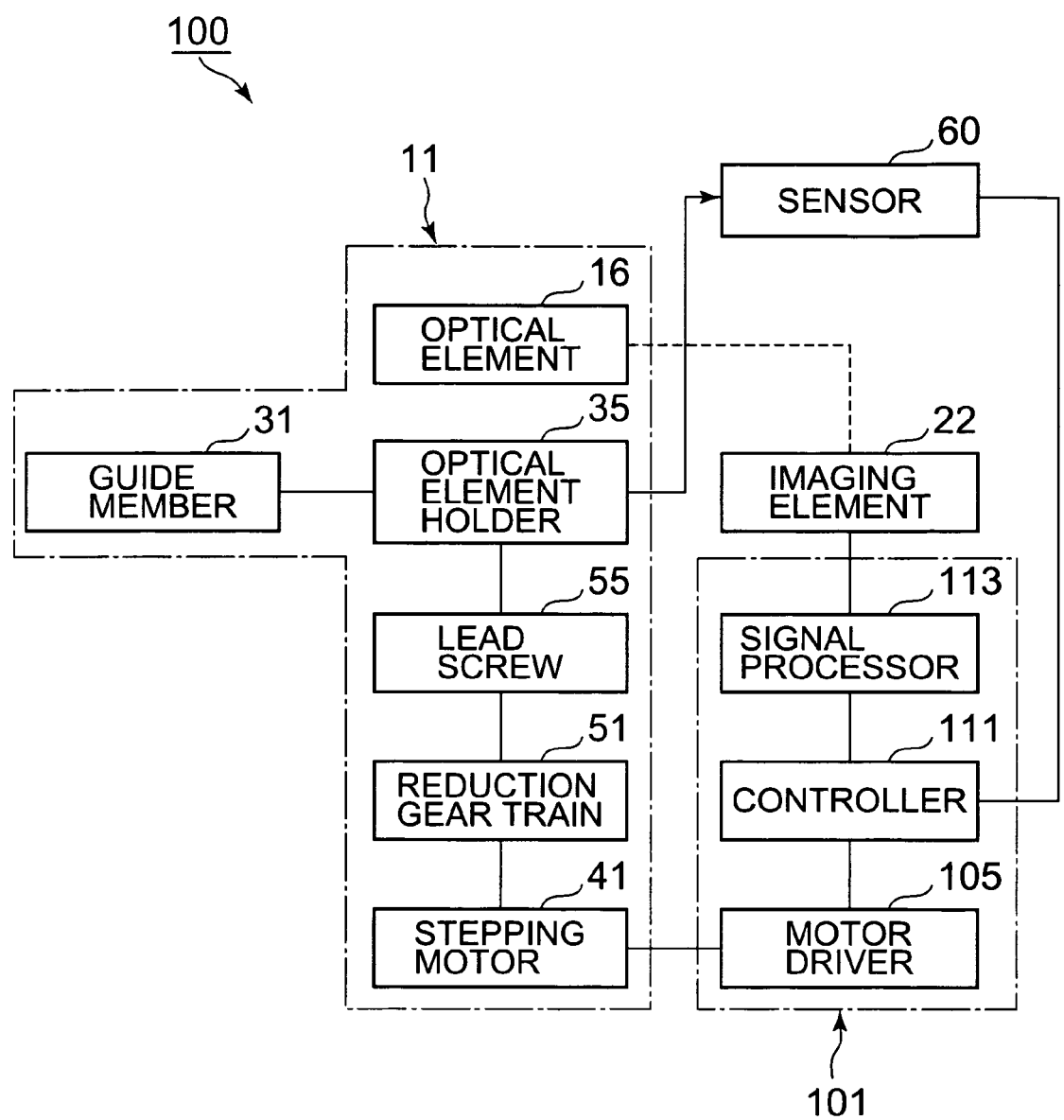
FIG. 10 is a sectional view illustrating a camera module to which an optical module according to a seventh embodiment of the invention is applied.

FIG. 10 illustrates a seventh embodiment of the invention. This embodiment is a use example in which the optical module of the invention is applied to an electronic appliance. Also, elements of the embodiment identical to those of the above-described embodiments are designated by the same reference numerals, respectively, and no description thereof will be given.

The optical module 11 may be incorporated in a camera module 100 which is mounted in a camera. The camera module 100 may includes, for example, the optical module 11, the imaging element 22, and a circuit block 101. The imaging element 22 converts an image subjected to focus adjustment or zooming through a lens, which is the optical element 16 of the optical module 11, into an electronic signal. The circuit block 101 includes a controller 111, a motor driver 105, and a signal processor 113. The controller 111 includes a CPU, a memory, and the like. The controller 111 performs control for the entire portion of the camera module 100 including control for operation of the imaging element 22. The motor driver 105 applies a desired drive signal to the motor. The signal processor 113 processes an image signal outputted from the imaging element 22, and supplies the processed signal to the controller 111.

Figure 11:
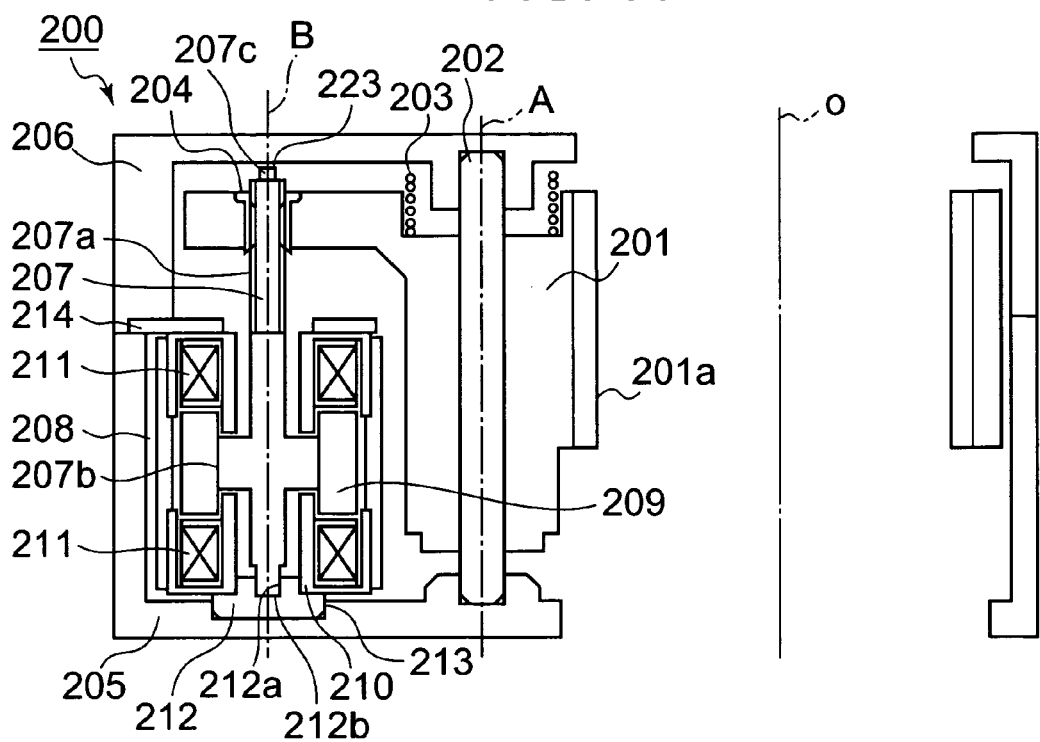
FIG. 11 is a sectional view illustrating a part of a lens driving apparatus according to an eighth embodiment of the invention.

FIG. 11 illustrates an eighth embodiment of the invention. FIG. 11 is a sectional view of a lens driving apparatus 200.

The lens driving apparatus 200 includes a base member 205, a cover 206, an optical element holder 201, and a driving unit. The lens driving apparatus 200 also includes a circuit board (not shown) for driving the driving unit. The circuit board includes an imaging element. In addition, a lens unit (not shown) is threadedly fitted in a female threaded part 201a of the optical element holder 201.

In this embodiment, the driving unit includes a cylindrical stepping motor 208. The stepping motor 208 is structured to input a signal to coils 211, to form a magnetic circuit in a yoke 210, to generate magnetic force between the magnetic circuit and a magnet 209, and thus, to generate rotating force at the magnet 209. The magnet 209 is fixed to a magnet support portion 207b of a lead screw 207 as a rotating shaft in a press-fitted manner or in a bonded manner. Accordingly, the magnet 209 is rotated integrally with the lead screw 207. The above-described constituent elements of the stepping motor 208 form a unit. The lead screw 207 includes a threaded section 207a threadedly coupled to a nut 204 fixed to the optical element holder 201. A slight tolerance is given between the threaded coupling surfaces of the threaded section 207a and nut 204.

The lead screw 207 is supported by one radial bearing and one thrust bearing. In this embodiment, the lead screw 207 is supported by a radial bearing hole 212a and which are formed at a bearing 212 arranged in the stepping motor 208 and a thrust bearing surface 212b. A slight tolerance is given between the radial bearing hole 212a and the surface of the lead screw 207 contacting the radial bearing hole 212a.

The position of the stepping motor 208 in a direction perpendicular to an optical axis O, namely, a planar direction, and in a direction parallel to the optical axis O is determined by a motor guide member 213 mounted to the base member 205. The stepping motor 208 is also fixed to the base member 205 by a motor support plate 214. That is, the stepping motor 208 is unmovably fixed to the base member 205.

The optical element holder 201 is guided by a guide shaft 202 to move along a central line A of the guide shaft 202 parallel to the optical axis O.

The optical element holder 201 is also biased along the optical axis O by an elastic spring 203. The elastic bias force causes concentration of the rocking of the threaded coupling regions of the threaded section 207a of the lead screw 207 and nut 204 to one side. The elastic bias force also urges the lead screw 207, which is the rotating shaft of the stepping motor 208, against the thrust bearing surface 212b, and suppresses the thrust rocking of the stepping motor 208.

A thrust butting portion 207c is formed at the leading end of the lead screw 207. The thrust butting portion 207c has a circular column shape, and has a diameter smaller than the screw diameter of the lead screw 207. Normally, a thrust gap 223 is defined between the cover 206 and the thrust butting portion 207c.

With the above-described configuration, it is possible to rectilinearly move the optical element holder 201 in accordance with a rotating operation of the stepping motor 208. Also, since the lead screw 207 is arranged to be inclinedly movable with respect to the guide shaft 202, it is possible to smoothly operate the optical element holder 201.

Also, since one of the two radial bearings typically required in the stepping motor 208 can be dispensed with, it is possible to provide an inexpensive lens driving apparatus.

Meanwhile, when upward movement of the lead screw 207 occurs during operation of the lead screw 207, the thrust gap 223 is eliminated, thereby causing the thrust butting portion 207c to first come into contact with the cover 206. In this case, the fastening caused by such contact can be easily released because the diameter of the thrust butting portion 207c is small.

Although the upper bearing is dispensed with in this embodiment, the same effect as described above can be obtained even when certain amount of rocking is involved so long as it does not interfere with the inclined movement of the lead screw 207. It is preferred that the rocking amount is not less than 20 μm, in particular, in a range of 40 to 60 μm.

Figure 12:
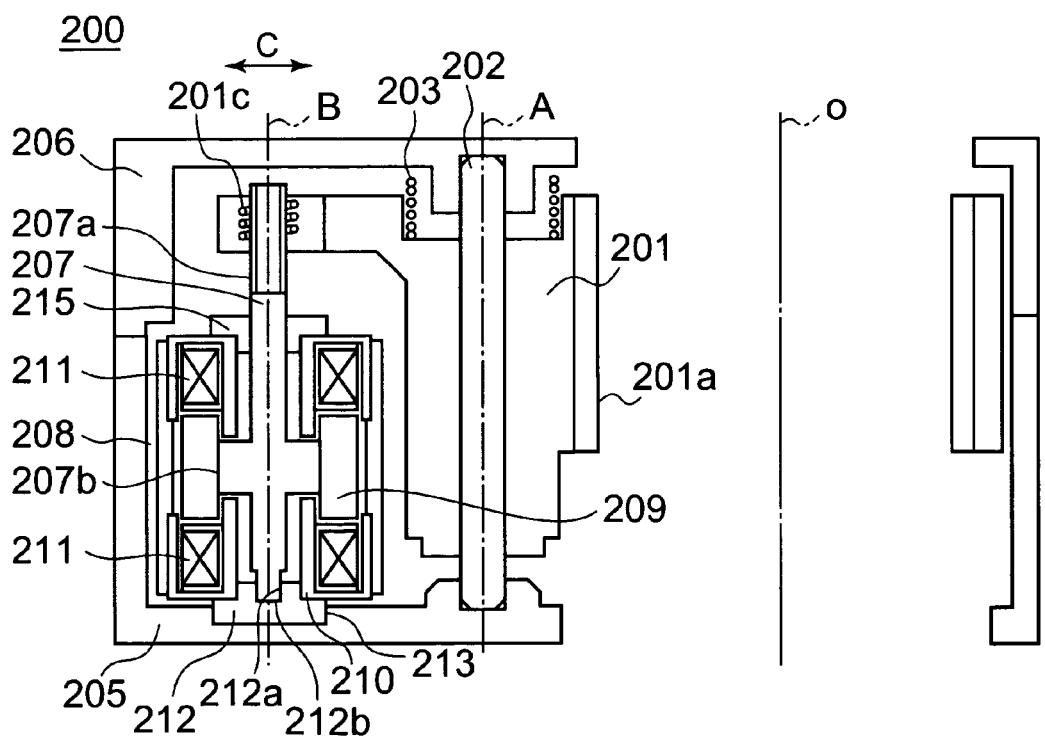
FIG. 12 is a sectional view illustrating a part of a lens driving apparatus according to a ninth embodiment of the invention.
Figure 13:
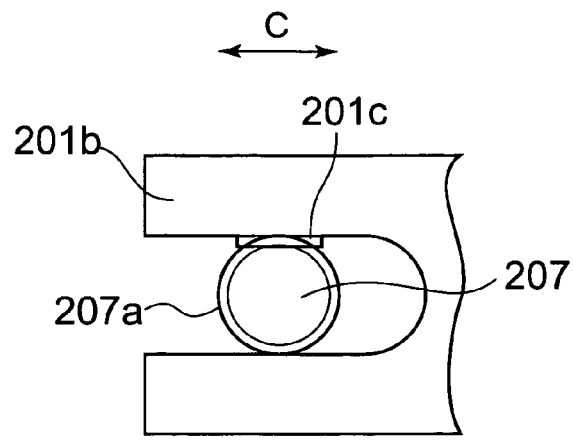
FIG. 13 is a plan view illustrating a threaded coupling portion of a lead screw included in the lens driving apparatus of FIG. 12.
Figure 14:
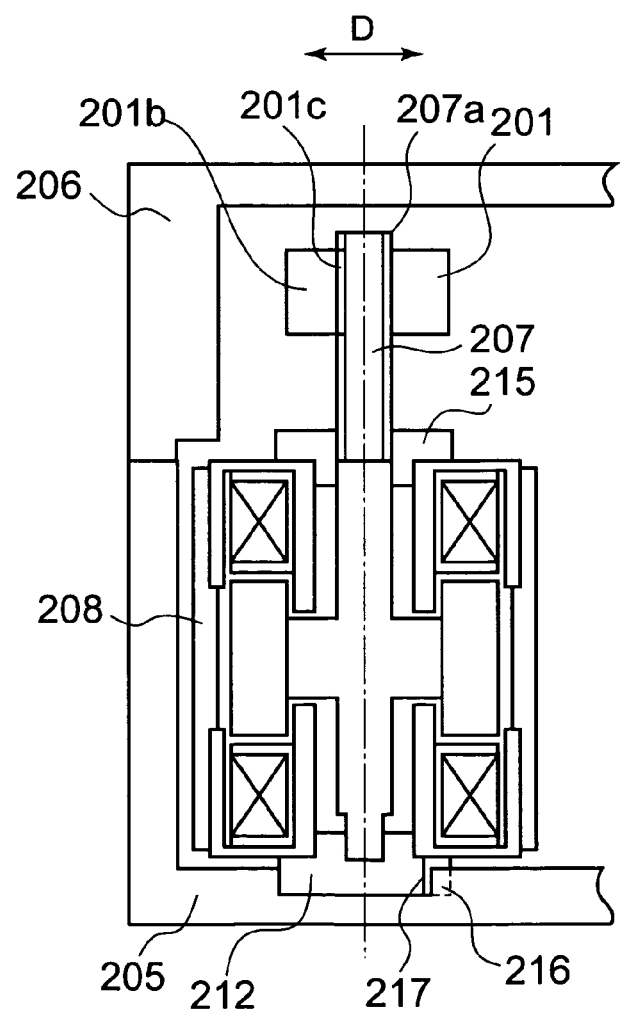
FIG. 14 is a sectional view of the lead screw shown in FIG. 12 when viewed at a 90°-rotated position.

FIGS. 12 to 14 illustrate a ninth embodiment of the invention. FIG. 12 is a sectional view of a lens driving apparatus 200. FIG. 13 is a plan view illustrating a threaded coupling portion of a lead screw 207. FIG. 14 is a sectional view of the lead screw 207 shown in FIG. 12 when viewed at a position 90° rotated about an axis B.

Basically, this embodiment is identical to the eighth embodiment. Accordingly, elements of the ninth embodiment identical to those of the eighth embodiment are designated by the same reference numerals, respectively, and no description thereof will be given. The ninth embodiment is different from the eighth embodiment in the supporting manners of the lead screw 207 and the stepping motor 208.

In detail, the lead screw 207 is restricted to a position slightly spaced apart from the central axis B of the lead screw 207 in a radial direction by bearings 212 and 215 mounted in the stepping motor 208. Also, the lead screw 207 is threadedly coupled with a threaded surface 201c formed integrally with an optical element holder 201. The threaded surface 201c is formed at one side of an inner surface of a U-shaped portion 201b in the optical element holder 201.

Accordingly, the threaded surface 201c does not restrict the lead screw 207 in a direction C, so that it is possible to prevent creaking in a lateral direction (the direction of arrows C) when viewed in FIG. 12.

The planar position of the stepping motor 208 is more or less determined because the bearing 212 is guided by the motor guide member 213 mounted to the base member 205. Also, the stepping motor 208 is restricted from rotating about the axis B by a rotation stopper 216 provided at the base member 205 and a rotated position restrictor 217 provided at the stepping motor 208. However, the stepping motor 208 can move inclinedly in a direction of arrows D about the motor guide member 213 as a support point. That is, the motor guide member 213 supports a non-rotary portion of the stepping motor 208 such that the non-rotary portion is inclinedly movable. Here, the direction of arrows D is orthogonal to the direction of arrows C in a plane perpendicular to the optical axis O.

Accordingly, creaking in the direction of arrows D can be prevented by the inclined movement of the stepping motor 208, and thus, the lead screw 207.

The elastic spring 203 not only eliminates the thrust rocking of the threaded coupling portions of the lead screws 207 and threaded surface 201c, but also restrict the positions of the stepping motor 208 and base member 205 in the thrust direction.

Thus, since it is possible to prevent creaking in the planar direction caused by the positional relation between the axis A and the axis B, the optical element holder 201 can be smoothly operated.

Figure 15:
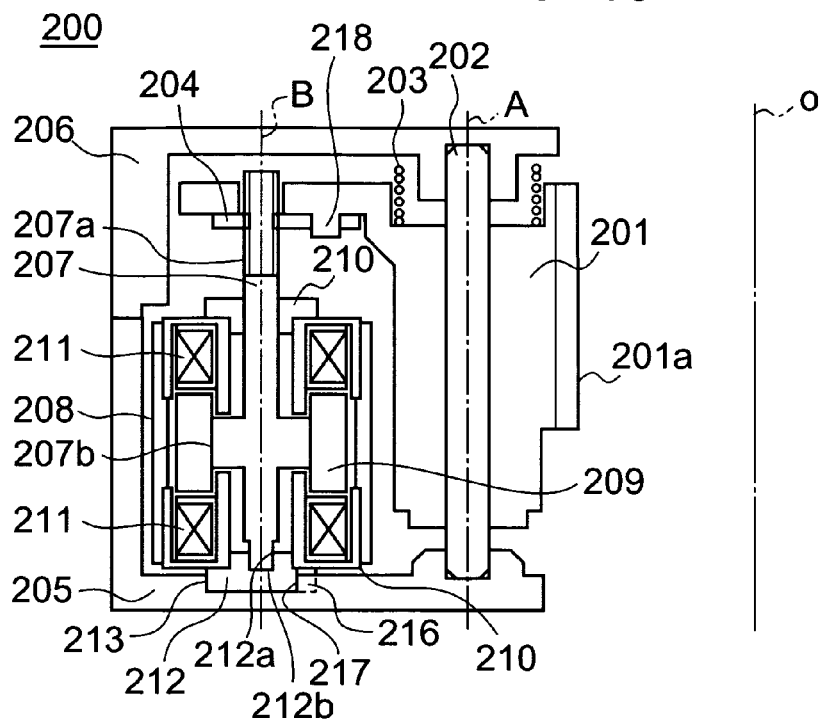
FIG. 15 is a sectional view illustrating a part of a lens driving apparatus according to a tenth embodiment of the invention.

FIG. 15 illustrate a tenth embodiment of the invention. Basically, this embodiment is identical to the ninth embodiment. Accordingly, elements of the tenth embodiment identical to those of the ninth embodiment are designated by the same reference numerals, respectively, and no description thereof will be given. The tenth embodiment is different from the ninth embodiment in terms of the method for supporting the lead screw 207 and the method for supporting the stepping motor 208.

The lead screw 207 is threadedly coupled with a nut 204 which is installed as a separate member from an optical element holder 201. The nut 204 is in contact with the optical element holder 201 in a direction of an axis B by a bias force of the elastic spring 203. The nut 204 is also supported by a rotation guide pin 218 arranged on the optical element holder 201 at a position different from the axis B such that the nut 204 is rotatable about the optical element holder 201.

Accordingly, creaking in a direction perpendicular to the drawing plane (sheet plane) of FIG. 15 can be prevented by rotation of the nut 204.

Meanwhile, the position of the stepping motor 208 in a planar direction at one end of the stepping motor 208 is guided by a motor guide member 213 mounted to the base member 205. Also, the movement of the stepping motor 208 in a rotation direction is restricted by a rotation stopper 216 provided at a base member 205. Accordingly, the stepping motor 208 is inclinedly movable in a lateral direction when viewed in FIG. 15, so that it is possible to prevent creaking in the same direction.

Thus, since it is possible to prevent creaking in the planar direction caused by the positional relation between the axis A and the axis B, the optical element holder 201 can be smoothly operated.

Figure 16:
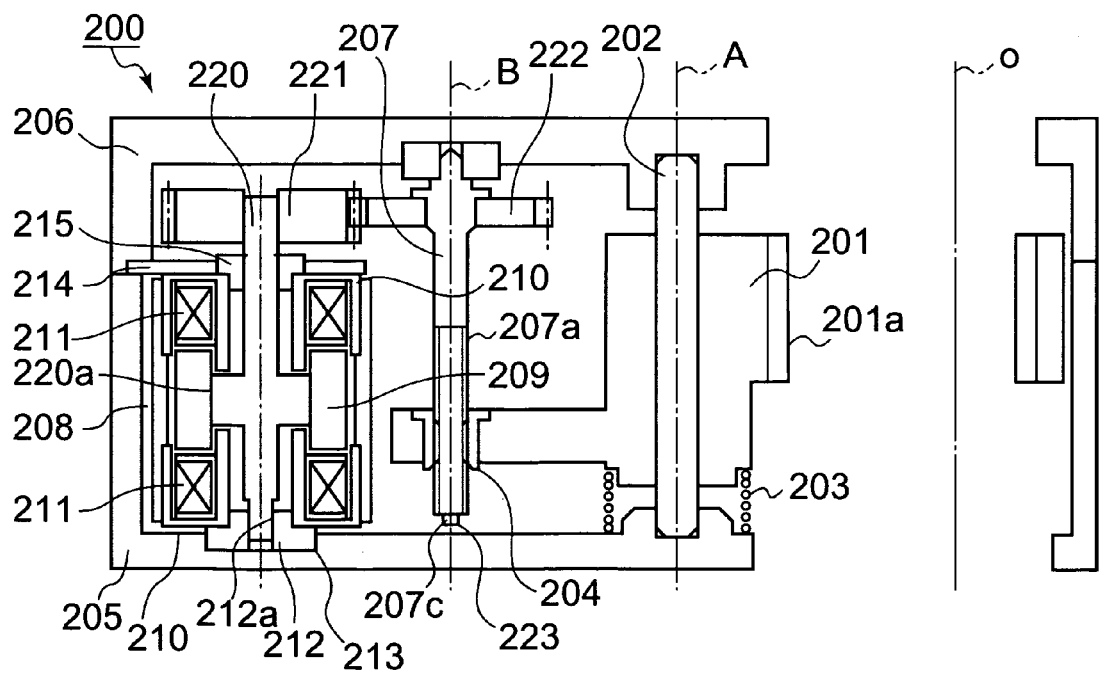
FIG. 16 is a sectional view illustrating a part of a lens driving apparatus according to an eleventh embodiment of the invention.

FIG. 16 illustrates an eleventh embodiment of the invention. Basically, this embodiment is identical to the eighth embodiment. Accordingly, elements of the eleventh embodiment identical to those of the eighth embodiment are designated by the same reference numerals, respectively, and no description thereof will be given. The eleventh embodiment is different from the eighth embodiment in that spur gears are used for a transmission for transmitting the power of the stepping motor 208, and in terms of the rotation bearing structure of the stepping motor 208.

In detail, the stepping motor 208 is completely fixed to a base member 205. The stepping motor 208 includes a rotating shaft 220 supported in a radial direction by two bearings 212 and 215 mounted in the stepping motor 208. A drive gear 221 is fixed to the rotating shaft 220. The drive gear 221 transmits power to a driven gear 222 fixed to the lead screw 207.

The lead screw 207 is supported by a bearing 224 in a radial direction and in a thrust direction opposite to an urging direction of an elastic spring 203.

Accordingly, it is possible to prevent creaking in the planar direction caused by the positional relation between the axis A and the axis B, so that the optical element holder 201 can be smoothly operated.

A lead screw thrust restrictor 207c is provided at the leading end of the lead screw 207. The thrust restrictor 207c has a structure capable of easily releasing a fastened condition of the lead screw 207, in cooperation with a thrust gap 223.

Figure 17:
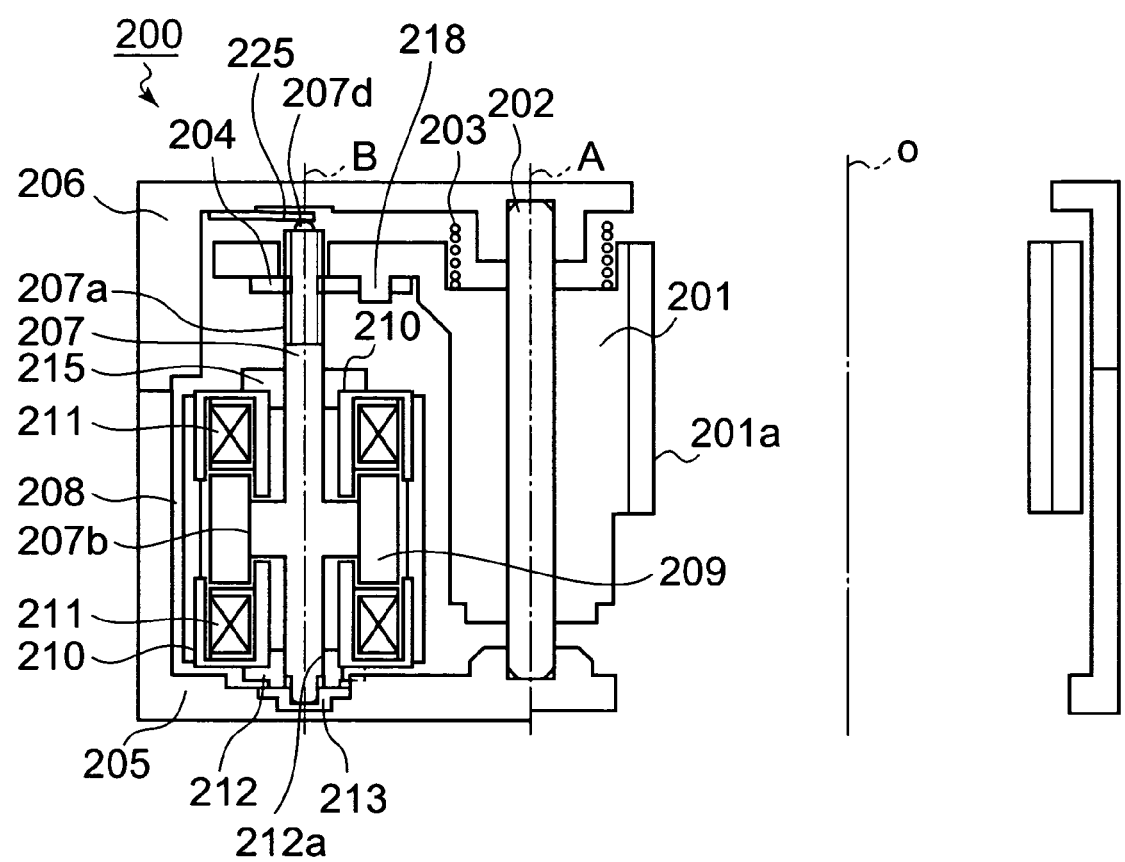
FIG. 17 is a sectional view illustrating a part of a lens driving apparatus according to a twelfth embodiment of the invention.

FIG. 17 illustrate a twelfth embodiment of the invention. Basically, this embodiment is identical to the tenth embodiment. Accordingly, elements of the twelfth embodiment identical to those of the tenth embodiment are designated by the same reference numerals, respectively, and no description thereof will be given. The twelfth embodiment is different from the tenth embodiment in terms of the methods for supporting the lead screw 207 and the stepping motor 208.

The lead screw 207 is restricted in a radial direction by bearings 212 and 215 mounted in the stepping motor 208. A hemispherical spring seat 207d is provided at a leading end, namely, upper end, of the lead screw 207. The spring seat 207d is elastically supported in a thrust direction by a rotating shaft spring 225 fixed to a cover 206. Accordingly, the lead screw 207 is biased in the thrust direction. The lead screw 207 biased in the thrust direction is in contact with a base member 205. In this embodiment, the lead screw 207 is in contact with a motor guide member 213 mounted to the base member 205.

The motor guide member 213 guides the stepping motor 208 in a planar direction. In this embodiment, the motor guide member 213 guides a lower end of the lead screw 207 in a radial direction.

Similarly to the tenth embodiment, the stepping motor 208 includes a rotation stopping mechanism.

With the above-described configuration, the stepping motor 208 is inclinedly movable in a plane parallel to the optical axis (in a direction perpendicular to an axis B of FIG. 17), so that it is possible to prevent creaking in the same direction. Also, the nut 204 threadedly coupled to the lead screw 207 is rotatable in a direction perpendicular to the above-described direction along a rotation guide pin 218, so that it is possible to prevent creaking in the same direction.

Accordingly, it is possible to prevent creaking in the planar direction caused by the positional relation between the axis A and the axis B, so that the optical element holder 201 can be smoothly operated.

Meanwhile, the rocking of the threaded coupling portions of the threaded section 207a of the lead screw 207 and nut 204 is concentrated to one side by an elastic spring 203. Also, the rotating shaft spring 225 urges the lead screw 207, which is the rotating shaft of the stepping motor 208, against a thrust bearing surface (the thrust bearing surface of the motor guide member 213), and thus, suppresses the thrust rocking of the stepping motor 208. Since the elastic springs have different functions, respectively, it is also possible to reduce the elastic force of each elastic spring. In particular, the elastic force of the rotating shaft spring 225 does not generate large torque loss because it acts near the rotating shaft. However, the elastic force of the elastic spring 203 is liable to function as a large load to the driving unit. In this connection, since the spring force of the elastic spring 203 can be restricted, it does not function as a large load to the driving unit. As a result, it is possible to miniaturize the driving unit, and thus, to achieve the compactness of the lens driving apparatus. Also, the invention is not limited to the above-described embodiments. For example, in an optical module for moving an optical element holder, which supports an optical element having an optical axis and is movable along a guide member, in an extension direction of the optical axis, using a nut member integrally provided at the holder, and a lead screw threadedly coupled to the nut member to rotate forward and backward by a driving unit, means for transmitting the forward or backward rotation of the driving unit via a transmission, and enabling the lead screw to be inclinedly movable with respect to the extension direction of the optical axis about the threaded coupling portions of a threaded section of the lead screw and nut member may be configured as follows.

That is, one end of the lead screw is supported by a thrust bearing having a radial bearing hole, as shown in FIGS. 5A and 5B. The other end of the lead screw is also supported by a thrust bearing having a radial bearing hole, as shown in FIGS. 5A and 5B. The tolerance in a radial direction given to the portion of the lead screw arranged at the other end side of the lead screw near, the threaded section is set to be 20 μm or more, so as to be larger than the tolerance in the radial direction given to the portion of the lead screw arranged at one end side of the lead screw near the transmission. In particular, stable performance can be obtained on the order of 40 μm. Accordingly, the lead screw can be freely inclinedly moved in accordance with the position and parallelism deviations of the lead screw with reference to the guide shaft when the lens barrel holder is moved along the guide shaft or the like in accordance with rotation of the lead screw, without causing damage of the rotating force transmitting function of the transmission. Accordingly, the problems to be solved in the invention can also be solved.

Also, in the invention, in an optical module for moving an optical element holder, which supports an optical element having an optical axis and is movable along a guide member, in an extension direction of the optical axis, using a nut member integrally provided at the holder, and a lead screw threadedly coupled to the nut member to rotate forward and backward by a driving unit, the following configurations may be implemented.

That is, a first bearing is fixed to a cover (one base member), with which a guide shaft is integrated using a press-fitting method or the like, using a press-fitting method or the like, and one end section of the lead screw arranged near the transmission is freely rotatably supported by the first bearing. Also, a second bearing is fixed to the other base member using a press-fitting method or the like, and the other end section of the lead screw arranged near a threaded section of the lead screw is freely rotatably fitted in the second bearing. Thus, the opposite ends of the lead screw can be supported by the bearings in order to prevent generation of position and parallelism deviations of the lead screw with respect to the guide shaft.

Also, although the motor has been illustrated as the driving unit in the above-described embodiments, other power sources may be used. For example, power may be manually input.

In addition, although the rotating force generated by the driving unit has been described as being transmitted to the lead screw via the gear train in the above-described embodiments, other transmission mechanisms may be implemented. For example, the lead screw may be integrated with the output shaft of the driving unit so that the lead screw is operated directly by the driving unit.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. An optical module comprising:
   an optical element which has an optical axis, and is movable in an extension direction of the optical axis;
   an optical element holder which has a nut member integrated with the optical element holder, and supports the optical element;
   a guide member which guides the optical element holder to be movable in the extension direction of the optical axis;
   a lead screw which has a threaded section threadedly coupled to the nut member such that the lead screw is supported by the optical element holder while being inclinedly movable with respect to the extension direction of the optical axis; and
   a driving unit which supplies power for forward and backward rotation to the lead screw.

2. The optical module according to claim 1, further comprising:
   a thrust bearing which supports the lead screw; and
   elastic urging means which urges the lead screw against the thrust bearing.

3. The optical module according to claim 2, wherein:
   the lead screw has a small-diameter end section centrally protruded from a surface of the lead screw supported by a thrust bearing surface of the thrust bearing;
   the thrust bearing has a radial bearing hole defined by a radial bearing surface at a central portion of the thrust bearing; and
   the small-diameter end section is movably received in the radial bearing hole.

4. The optical module according to claim 3, wherein:
   the small-diameter end section extends through the thrust bearing; and
   the thrust bearing has a recess formed to be joined to the radial bearing hole at an end of the thrust bearing positioned opposite to the thrust bearing surface such that the radial bearing surface is interposed between the thrust bearing end and the thrust bearing surface, the recess having a diameter larger than a diameter of the radial bearing hole.

5. The optical module according to claim 1, further comprising:
   a thrust bearing which supports the lead screw;
   a radial bearing which supports the lead screw; and
   elastic urging means which urges the lead screw against the thrust bearing.

6. The optical module according to claim 1, further comprising:
   a gear train which transmits the power of the driving unit to the lead screw,
   wherein the gear train comprises an input gear and a final gear mounted to the lead screw and meshed with the input gear, and
   wherein the meshing depth of the final gear with the input gear is larger than a movement amount of the final gear generated when the lead screw carries out a maximal inclined movement.

7. The optical module according to claim 1, wherein each of the threaded section of the lead screw and the nut member comprises triangular or trapezoidal threads.

8. The optical module according to claim 1, wherein the nut member is press-fitted in the optical element holder, and an elongated protrusion is formed on at least one of the nut member and a fixing member facing the nut member in the extension direction of the optical axis to extend toward the other one of the nut member and the fixing member, the elongated protrusion determining a maximal movement amount of the optical element holder.

9. The optical module according to claim 1, further comprising:
a gear arranged between a portion of the lead screw supported by and contacting the radial bearing and the nut member such that the gear rotates together with the lead screw.

10. The optical module according to claim 1, wherein:
the driving unit is a motor which has an output rotating shaft, and is configured in the form of a unit; and
the lead screw is formed integrally with the output rotating shaft.

11. The optical module according to claim 10, wherein the motor is supported to be inclinedly movable with respect to the extension direction of the optical axis.

12. The optical module according to claim 11, wherein the motor is supported to be inclinedly movable only in a plane parallel to the optical axis.

13. A camera module using the optical module according to claim 1.

14. An optical module comprising:
an optical element which has an optical axis, and is movable in an extension direction of the optical axis;
a lead screw which has a threaded section;
an optical element holder which supports the optical element being moved in the extension direction of the optical axis by a nut member threadedly coupled to the threaded section;
a guide member which guides the optical element holder to be movable in the extension direction of the optical axis; and
a driving unit which supplies power for forward and backward rotation to the lead screw,
the optical module further comprising:
a butting portion for restricting an operation range of the lead screw in the extension direction of the optical axis within a predetermined amount.

15. The optical module according to claim 14, wherein the butting portion has a diameter smaller than an outer diameter of the threaded section about a rotation axis of the lead screw.

16. The optical module according to claim 14, further comprising:
a gear train which transmits the power of the driving unit to the lead screw, and comprises a first gear and a second gear which meshes with the first gear to transmit the power,
wherein the lead screw rotates integrally with the second gear, and
wherein one of the gears has a tooth pitch larger than the predetermined amount.

17. The optical module according to claim 14, wherein:
the driving unit is a motor which has an output rotating shaft, and is configured in the form of a unit; and
the lead screw is formed integrally with the output rotating shaft.

18. The optical module according to claim 17, wherein the motor is supported to be inclinedly movable with respect to the extension direction of the optical axis.

19. The optical module according to claim 18, wherein the motor is supported to be inclinedly movable only in a plane parallel to the optical axis.

20. A camera module using the optical module according to claim 14.

* * * * *